US010743345B2

(12) United States Patent
Li et al.

(10) Patent No.: US 10,743,345 B2
(45) Date of Patent: Aug. 11, 2020

(54) SELF-CONTAINED COMMUNICATION WITH COORDINATION SIGNALING FOR LISTEN-AFTER-TALK SCHEME

(71) Applicant: TELEFONAKTIEBOLAGET L M ERICSSON (PUBL), Stockholm (SE)

(72) Inventors: Gen Li, Beijing (CN); Junaid Ansari, Aachen (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 143 days.

(21) Appl. No.: 15/573,087

(22) PCT Filed: Sep. 13, 2017

(86) PCT No.: PCT/CN2017/101565
§ 371 (c)(1),
(2) Date: Nov. 9, 2017

(87) PCT Pub. No.: WO2019/051664
PCT Pub. Date: Mar. 21, 2019

(65) Prior Publication Data
US 2019/0215865 A1    Jul. 11, 2019

(51) Int. Cl.
H04W 74/08    (2009.01)
H04W 74/00    (2009.01)
H04L 5/00     (2006.01)

(52) U.S. Cl.
CPC ......... H04W 74/0816 (2013.01); H04L 5/005 (2013.01); H04L 5/0055 (2013.01); H04W 74/002 (2013.01); H04W 74/08 (2013.01)

(58) Field of Classification Search
CPC ............ H04W 74/0808; H04W 74/00; H04W 74/002; H04W 74/008; H04W 74/02;
(Continued)

(56) References Cited

U.S. PATENT DOCUMENTS 10,256,881 B2 * 4/2019 Gong ................ H04W 74/0816
2011/0149918 A1    6/2011 Gong et al.
(Continued)

FOREIGN PATENT DOCUMENTS

CN    106376050 A    2/2017
CN    106921477 A    7/2017
(Continued)

OTHER PUBLICATIONS

Huawei et al., "Disucssion on frame structure for NR", 3GPP TSG RAN WGI Meeting #85, R1-164032, May 27, 2016.
(Continued)

Primary Examiner — Edan Orgad
Assistant Examiner — Nourali Mansoury
(74) Attorney, Agent, or Firm — Withrow & Terranova, PLLC

(57) ABSTRACT

A source node identifies a communication interval for communication with a destination node, the communication interval comprising a control interval, a data interval disposed after the control interval, a coordination interval disposed after the data interval, and a feedback interval disposed after the coordination interval. The source node transmits one or more control signals during the control interval, transmits one or more data signals during the data interval, transmits or receiving one or more coordination signals during the coordination interval, the one or more coordination signals coordinating at least one aspect of a listen-after-talk (LAT) procedure, and listens for one or more feedback signals during the feedback interval, the one or more feedback signals indicating a status of the transmission of the one or more data signals.

44 Claims, 18 Drawing Sheets

(58) Field of Classification Search
CPC . H04W 74/04; H04W 74/08; H04W 74/0833; H04W 74/0866; H04W 72/0433; H04W 72/1289
See application file for complete search history.

(56) References Cited

U.S. PATENT DOCUMENTS

| | | | |
|---|---|---|---|
| 2016/0095110 A1* | 3/2016 | Li | H04W 72/1215 370/329 |
| 2017/0201968 A1* | 7/2017 | Nam | H04W 4/70 |
| 2018/0077725 A1* | 3/2018 | Sun | H04W 74/0816 |
| 2019/0036658 A1* | 1/2019 | Kim | H04L 5/005 |

FOREIGN PATENT DOCUMENTS

| | | |
|---|---|---|
| WO | 2014202134 A1 | 12/2014 |
| WO | 2016/197315 A1 | 12/2016 |
| WO | 2018152671 A1 | 8/2018 |

OTHER PUBLICATIONS

Ericsson, "Details on NR impact to support unlicensed operation" 3GPP TSG RAN WG2 Meeting 93bis, R2-162751, Apr. 15, 2016.

Ericsson, "On Physical Layer Design Policies for Unlicensed Operation of NR", 3GPP TSG RAN WG1 NR Ad-Hoc# R1-1711524, Jun. 30, 2017.

Extended European Search Report for European Patent Application No. 17925406.5, dated Jun. 21, 2019, 8 pages.

International Search Report and Written Opinion for International Patent Application No. PCT/CN2017/101565, dated May 30, 2018, 6 pages.

Luo et al., "Preliminary radio interface concepts for mm-wave mobile communications," Millimetre-Wave Based Mobile Radio Access Network for Fifth Generation Integrated Communications (mmMAGIC), Deliverable D4.1, Document No. H2020-ICT-671650-mmMAGIC/04.1, Jul. 7, 2016, 232 pages.

Luo et al., "Preliminary radio interface concepts for mm-wave mobile communications", Millimetre-Wave Based Mobile Radio Access Network for Fifth Generation Integrated Communications (mmMAGIC), Deliverable D4.1 , H2020-ICT-671650-mmMAGIC/D4.1, Jul. 7, 2016.

Extended European Search Report for European Patent Application No. 20153351.0, dated Mar. 9, 2020, 9 pages.

* cited by examiner

SELF-CONTAINED COMMUNICATION WITH COORDINATION SIGNALING FOR LISTEN-AFTER-TALK SCHEME

RELATED APPLICATIONS

This application is a national phase of Patent Cooperation Treaty (PCT) patent application No. PCT/CN2017/101565, filed Sep. 13, 2017, the disclosures of which is hereby incorporated herein by reference in its entirety.

TECHNICAL FIELD

The disclosed subject matter relates generally to telecommunications. Certain embodiments relate more particularly to Third Generation Partnership (3GPP) New Radio (NR) and self-contained communication with coordination signaling for a listen-after-talk (LAT) scheme.

BACKGROUND

Fifth generation (5G) wireless telecommunications systems are currently under development. One aspect of this development is the specification by 3GPP of an NR interface intended to provide new and/or improved capabilities compared to prior radio interfaces. Systems employing such an interface, commonly referred to as NR systems, may provide, e.g., greater traffic capacity, lower latency or higher data rates.

Mobile broadband is expected to continue as a main driver of the demand for high overall traffic capacity and high achievable end-user data rates. Several use-cases and deployment scenarios will require data rates of up to 10 Gbps, for example. These demands can be addressed by networks with distances between access nodes ranging from a few meters in indoor deployments to roughly 50 m in outdoor deployments, i.e., with an infrastructure density considerably higher than most dense networks of today. The wide transmission bandwidths needed to provide data rates of up to 10 Gbps and above can likely be obtained from spectrum allocations in the centimeter and millimeter-wave bands. High-gain beamforming, typically realized with array antennas, can be used to mitigate the increased pathloss at higher frequencies, and benefit from spatial reuse and multi-user schemes. Accordingly, these and other features are expected to be adopted as part of NR systems.

Besides using traditional licensed spectrum bands, NR systems are expected to operate in unlicensed bands and license-shared bands, especially for enterprise deployment scenarios. Consequently, coexistence support is needed to enable efficient spectrum sharing among different operators and/or other systems. One way to achieve this coexistence is through a Listen-before-talk (LBT) mechanism, which is a distributed mechanism that avoids a need to exchange information between different coexisting systems. While LBT has been effective in providing spectral coexistence for wide beamwidth transmissions, numerous studies (See e.g., FIG. 3) have shown that LBT is somewhat unreliable for highly directional transmissions.

In typical deployments of wireless local access networks (WLAN), carrier sense multiple access with collision avoidance (CSMA/CA) is used for medium access. This means that the channel is sensed for a clear channel assessment (CCA), and a transmission is initiated only if the channel is deemed to be idle. If the channel is deemed to be busy, the transmission is deferred until the channel is deemed to be idle. When the range of several access points (APs) using the same frequency overlap, transmissions related to one AP may be deferred in case a transmission on the same frequency to or from another AP which is within range can be detected. Effectively, this means that if several APs are within range, they must share the channel in time, and the throughput for the individual APs may be severely degraded compared to their isolated deployments. A general illustration of the LBT mechanism is shown in FIG. 1.

After a Wi-Fi station "A" transmits a data frame to a station "B", station B shall transmit an acknowledgement (ACK) frame back to station A with a delay of 16 μs. Such an ACK frame is transmitted by station B without performing the LBT operation. To prevent another station from interfering with such an ACK frame transmission, a station must defer for a duration of 34 μs (referred to as DIFS) after the channel is observed to be occupied before a subsequent attempt to assess again whether or not the channel is occupied.

Therefore, a station that intends to transmit first performs a CCA by sensing the medium for a fixed duration DIFS. If the medium is found to be idle, the station assumes that it may take ownership of the medium and begin a frame exchange sequence. If the medium is busy, the station waits for the medium to go idle, defers for DIFS, and waits for a further random back off period.

To further prevent a station from occupying the channel continuously and thereby preventing other stations from accessing the channel, a station intending to transmit again after a transmission is completed must perform a random back off.

The PIFS is used to gain priority access to the medium, and is shorter than the DIFS duration. Among other cases, it can be used by stations operating under point coordination function (PCF), to transmit Beacon Frames with priority. At the nominal beginning of each Contention-Free Period (CFP), the station shall sense the medium. When a station determines that the medium is idle for one PIFS period (generally 25 μs), the station shall transmit a Beacon frame containing a coordination function (CF) Parameter Set element and a delivery traffic indication message element.

The widely used Wi-Fi systems based on IEEE 802.11b/g/n/ac standards operate in sub 6 GHz frequencies (2.4 and 5 GHz frequencies), and listen and talk operations, i.e., sensing, reception and transmission are predominantly omni-directional. An objective of LBT is to avoid interference between simultaneous data transmission. Practical application results show that this works well in this case.

In License Assisted Access (LAA) systems, an eNB may transmit information on a physical downlink shared channel (PDSCH) of an LAA Scell after first sensing the channel medium to be idle during the slot durations of a defer duration $T_d$; and after the counter N is zero in step (4). The counter N is adjusted by sensing the channel for additional slot duration(s) according to steps (1)-(6) below:

(1) Set $N=N_{init}$, where $N_{init}$ is a random number uniformly distributed between 0 and $CW_p$, and go to step (4);
(2) If N>0 and the eNB chooses to decrement the counter, set N=N−1;
(3) Sense the channel for an additional slot duration, and if the additional slot duration is idle, go to step (4); else, go to step (5);
(4) If N=0, stop; else, go to step (2).
(5) Sense the channel during the slot durations of an additional defer duration $T_d$;
(6) If the channel is sensed to be idle during the slot durations of the additional defer duration $T_d$, go to step (2); else, go to step (5);

If an eNB has not finished its transmission on PDSCH after step (4), the eNB may continue transmission after sensing the channel to be idle at least in slot durations of an additional defer duration $T_d$.

The defer duration $T_d$ includes a duration 16 µs≤$T_f$≤, 16 µs+$T_s$ immediately followed by $m_p$ consecutive slot durations, where each slot duration is 9 µs≤$T_{sl}$≤9 µs+$T_s$, and $T_f$ includes an idle slot duration $T_{sl}$ at start of $T_f$.

A slot duration $T_{sl}$ is considered to be idle if the eNB senses the channel during the slot duration, and the power detected by the eNB for at least 4 µs within the slot duration is less than an energy detection threshold $X_{Thresh}$. Otherwise, the slot duration $T_{sl}$ is considered to be busy.

$CW_{min, p}$≤$CW_p$≤$CW_{max, p}$ is a contention window.

$CW_{min, p}$ and $CW_{max, p}$ are chosen before step (1) of the above procedure.

$m_p$, $CW_{min, p}$ and $CW_{max, p}$ are based on channel access priority class associated with the eNB transmission, as shown in Table 1 below.

If the eNB transmits discovery signal transmission(s) not including PDSCH when N>0 in the procedure above, the eNB shall not decrement N during the slot duration(s) overlapping with discovery signal transmission.

The eNB shall not continuously transmit on a channel on which the LAA Scell(s) transmission(s) are performed, for a period exceeding $T_{m\,cot,\,p}$, as shown in Table 1 below.

For p=3 and p=4, if the absence of any other technology sharing the carrier can be guaranteed on a long term basis (e.g. by level of regulation), $T_{m\,cot,\,p}$=10 ms, otherwise $T_{m\,cot,\,p}$=8 ms.

TABLE 1

Channel Access Priority Class

| Channel Access Priority Class (p) | $m_p$ | $CW_{min,p}$ | $CW_{max,p}$ | $T_{m\,cot,p}$ | allowed $CW_p$ sizes |
|---|---|---|---|---|---|
| 1 | 1 | 3 | 7 | 2 ms | {3,7} |
| 2 | 1 | 7 | 15 | 3 ms | {7,15} |
| 3 | 3 | 15 | 633 | 8 or 10 ms | {15,31,63} |
| 4 | 7 | 15 | 1023 | 8 or 10 ms | {15,31,63,127, 255,511,1023} |

As indicated above, LBT is somewhat unreliable for highly directional transmissions. Consequently, there is a general need for improved or alternative approaches for coexistence in unlicensed or license-shared spectrum bands.

SUMMARY

In certain embodiments of the disclosed subject matter, a method of operating a source node in a wireless communications network comprises identifying a communication interval for communication between the source node and a destination node, the communication interval comprising a control interval, a data interval disposed after the control interval, a coordination interval disposed after the data interval, and a feedback interval disposed after the coordination interval, transmitting one or more control signals during the control interval, transmitting one or more data signals during the data interval, transmitting or receiving one or more coordination signals during the coordination interval, the one or more coordination signals coordinating at least one aspect of a listen-after-talk (LAT) procedure, and listening for one or more feedback signals during the feedback interval, the one or more feedback signals indicating a status of the transmission of the one or more data signals.

In certain related embodiments, the communication interval comprises a single slot.

In certain related embodiments, the communication interval comprises multiple slots. The one or more control signals may indicate e.g. at least one of a start location and a duration of the data interval.

In certain related embodiments, transmitting or receiving the one or more coordination signals during the coordination interval comprises at least one of transmitting or receiving a notify-to-send (NTS) message, and receiving a notify-not-to-send (NNTS) message. The NTS or NNTS message may comprise a fractional symbol message that occupies only part of a symbol in both the time and frequency domains. The fractional symbol message may reuse at least one of a sounding reference signal (SRS) and a demodulation reference signal (DM-RS). In another example, the NTS or NNTS is communicated in a randomly selected resource unit within the coordination interval. In yet another example, the NTS or NNTS is received from the destination node together with an acknowledgement (ACK) or negative acknowledgement (NACK) message.

In certain related embodiments, transmitting or receiving the one or more coordination signals during the coordination interval comprises receiving a notify-to-send (NTS) message or a notify-not-to-send (NNTS) message, and the method further comprises, deferring transmission for a duration indicated in the NTS or NNTS message, determining a coordination interval of a destination node that transmitted the NTS or NNTS message, and transmitting an NTS message to the destination node within the coordination interval of the destination node.

In certain related embodiments, the method further comprises, as a consequence of listening for the one or more feedback signals, determining that an acknowledgement (ACK) or negative acknowledgment (NACK) message has not been received in response to the transmission of the one or more data signals, detecting a notify-to-send (NTS) message from a destination node, and in response to detecting the NTS message, transmitting information to the destination node according to a timing indicated by the NTS message.

In some embodiments of the disclosed subject matter, a source node comprises processing circuitry, memory, and transceiver circuitry collectively configured to identify a communication interval for communication between the source node and a destination node, the communication interval comprising a control interval, a data interval disposed after the control interval, a coordination interval disposed after the data interval, and a feedback interval disposed after the coordination interval, transmit one or more control signals during the control interval, transmit one or more data signals during the data interval, transmit or receiving one or more coordination signals during the coordination interval, the one or more coordination signals coordinating at least one aspect of a listen-after-talk (LAT) procedure, and listen for one or more feedback signals during the feedback interval, the one or more feedback signals indicating a status of the transmission of the one or more data signals.

In certain related embodiments, the communication interval comprises a single slot.

In certain related embodiments, the communication interval comprises multiple slots. The one or more control signals may indicate at least one of a start location and a duration of the data interval.

In certain related embodiments, the transmission or reception of the one or more coordination signals during the coordination interval comprises at least one of transmitting or receiving a notify-to-send (NTS) message, and receiving a notify-not-to-send (NNTS) message. The NTS or NNTS message may comprise e.g. a fractional symbol message that occupies only part of a symbol in both the time and frequency domains. The fractional symbol message may reuse at least one of a sounding reference signal (SRS) and a demodulation reference signal (DM-RS). The NTS or NNTS may be communicated in a randomly selected resource unit within the coordination interval. The NTS or NNTS may be received from the destination node together with an acknowledgement (ACK) or negative acknowledgement (NACK) message.

In certain related embodiments, transmitting or receiving the one or more coordination signals during the coordination interval comprises receiving a notify-to-send (NTS) message or a notify-not-to-send (NNTS) message, and the method further comprises deferring transmission for a duration indicated in the NTS or NNTS message, determining a coordination interval of a destination node that transmitted the NTS or NNTS message, and transmitting an NTS message to the destination node within the coordination interval of the destination node.

In certain related embodiments, the processing circuitry, memory and transceiver circuitry are further collectively configured to, as a consequence of listening for the one or more feedback signals determine that an acknowledgement (ACK) or negative acknowledgment (NACK) message has not been received in response to the transmission of the one or more data signals, detect a notify-to-send (NTS) message from a destination node, and in response to detecting the NTS message, transmit information to the destination node according to a timing indicated by the NTS message.

In some embodiments of the disclosed subject matter, a method of operating a destination node in a wireless communications network comprises identifying a communication interval for communication between a source node and the destination node, the communication interval comprising a control interval, a data interval disposed after the control interval, a coordination interval disposed after the data interval, and a feedback interval disposed after the coordination interval, receiving one or more control signals during the control interval, receiving one or more data signals during the data interval, transmitting or receiving one or more coordination signals during the coordination interval, the one or more coordination signals coordinating at least one aspect of a listen-after-talk (LAT) procedure, and transmitting one or more feedback signals during the feedback interval, the one or more feedback signals indicating a decoding status of the one or more data signals.

In certain related embodiments, the communication interval comprises a single slot.

In certain related embodiments, the communication interval comprises multiple slots. The one or more control signals may indicate e.g. at least one of a start location and a duration of the data interval.

In certain related embodiments, transmitting or receiving the one or more coordination signals during the coordination interval comprises at least one of transmitting or receiving a notify-to-send (NTS) message, and transmitting a notify-not-to-send (NNTS) message. The NTS or NNTS message comprises a fractional symbol message that occupies only part of a symbol in both the time and frequency domains. The fractional symbol message may reuse at least one of a sounding reference signal (SRS) and a demodulation reference signal (DM-RS). The NTS or NNTS may be communicated in a randomly selected resource unit within the coordination interval. The NTS or NNTS may be received from the destination node together with an acknowledgement (ACK) or negative acknowledgement (NACK) message.

In certain related embodiments, the method further comprises, in response to a failure to decode the one or more data signals, transmitting a negative acknowledgement (NACK) during the feedback interval, and transmitting a notify-to-send (NTS) message to the source node during a coordination interval of a subsequent communication interval for communication between a source node and the destination node.

In certain related embodiments, the method further comprises, in response to decoding the one or more data signals, detecting a notify-to-send (NTS) message from the sending node during the coordination interval, transmitting a notify-not-to-send (NNTS) message during the coordination interval, and transmitting an acknowledgement (ACK) message during the feedback interval.

In some embodiments of the disclosed subject matter, a destination node comprises processing circuitry, memory and transceiver circuitry collectively configured to identify a communication interval for communication between a source node and the destination node, the communication interval comprising a control interval, a data interval disposed after the control interval, a coordination interval disposed after the data interval, and a feedback interval disposed after the coordination interval, receive one or more control signals during the control interval, receive one or more data signals during the data interval, transmit or receiving one or more coordination signals during the coordination interval, the one or more coordination signals coordinating at least one aspect of a listen-after-talk (LAT) procedure, and transmit one or more feedback signals during the feedback interval, the one or more feedback signals indicating a decoding status of the one or more data signals.

In certain related embodiments, the communication interval comprises a single slot.

In certain related embodiments, the communication interval comprises multiple slots. The one or more control signals may indicate at least one of a start location and a duration of the data interval.

In certain related embodiments, the transmission or reception of the one or more coordination signals during the coordination interval comprises at least one of transmitting or receiving a notify-to-send (NTS) message, and transmitting a notify-not-to-send (NNTS) message. The NTS or NNTS message may comprise a fractional symbol message that occupies only part of a symbol in both the time and frequency domains. The fractional symbol message may reuse at least one of a sounding reference signal (SRS) and a demodulation reference signal (DM-RS). The NTS or NNTS may be communicated in a randomly selected resource unit within the coordination interval. The NTS or NNTS may be received from the destination node together with an acknowledgement (ACK) or negative acknowledgement (NACK) message.

In certain related embodiments, the destination node further comprises, in response to a failure to decode the one or more data signals, transmitting a negative acknowledgement (NACK) during the feedback interval, and transmitting a notify-to-send (NTS) message to the source node during a coordination interval of a subsequent communication interval for communication between a source node and the destination node.

In certain related embodiments, the processing circuitry, memory and transceiver circuitry are further collectively configured to, in response to decoding the one or more data signals, detect a notify-to-send (NTS) message from the sending node during the coordination interval, transmit a notify-not-to-send (NNTS) message during the coordination interval, and transmit an acknowledgement (ACK) message during the feedback interval.

BRIEF DESCRIPTION OF THE DRAWINGS

The drawings illustrate selected embodiments of the disclosed subject matter. In the drawings, like reference labels denote like features.

DETAILED DESCRIPTION

Figure 1:
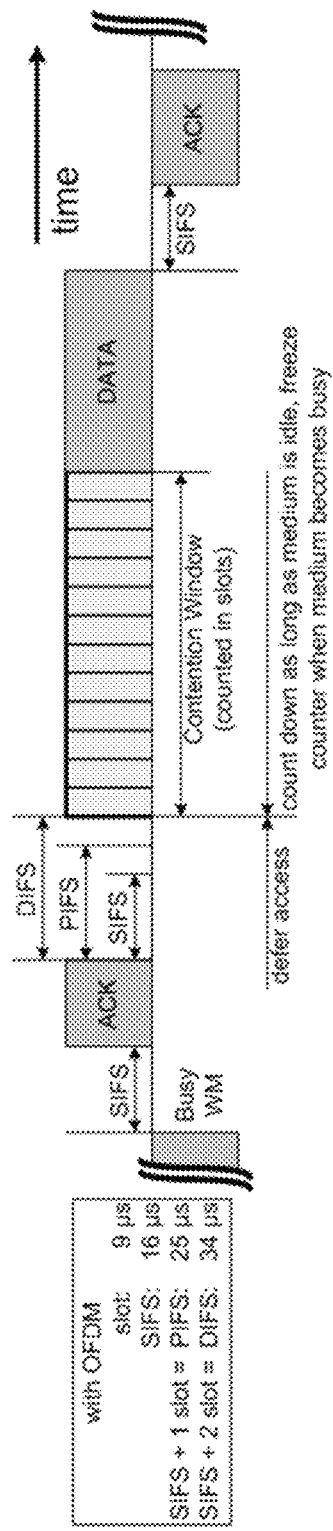
FIG. 1 illustrates a listen-before-talk (LBT) procedure in Wi-Fi.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the disclosed subject matter.

In the description that follows, certain embodiments are described in relation to 3GPP NR, but the described concepts are not limited to 3GPP NR and could be applied in other contexts as well. Accordingly, terms such as base station/gNodeB and UE should be considered as mere illustrations, and not as limiting the described concepts to a particular system or context. Certain embodiments are also described with respect to communication in NR unlicensed spectrum, but the described concepts are not limited to this context, and could be similarly implemented in the context of licensed spectrum, shared spectrum, etc.

The terms used to describe specific devices do not imply a certain hierarchical relation between the two. For instance, depending on the context the term "gNodeB" may be representative of the more general concept of a first device, and the term "UE" may be representative of the more general concept of a second device, where the first and second devices communicate with each other over some radio channel. Moreover, for the sake of clarity, certain embodiments may be described with respect to a "source node", which can be any device or apparatus that acts as the source of a data transmission, or a "destination node", which can be any device or apparatus that acts as the destination of a data transmission. For example, in some embodiments, a source node transmits data to a destination node and then receives related feedback from the destination node.

In certain embodiments, a listen-after-talk (LAT) scheme is employed for coexistence in unlicensed spectrum. This approach can be viewed as an alternative or a companion to LBT or other possible coexistence schemes. The LAT scheme is generally employed in communication scenarios involving directional communications, e.g. with high-gain beamforming, due to problems that arise in such scenarios, such as the following.

Unlike conventional omni-directional transmit and receive antenna radiation patterns, directional communications may be subject to so-called "hidden" and "exposed" node problems. Moreover, narrow beamwidth directional transmissions are more prone to a so-called "deafness" problem compared to wider beamwidth transmissions.

The hidden node problem arises when a source node (SN) is unable to listen to a potential interferer, resulting in interference at a destination node (DN). The exposed node problem arises when a source node overhears an ongoing transmission and refrains from its own transmission although its transmission would not have interfered with the ongoing transmission at a destination node. The deafness problem arises when a destination node is unable to detect a directional transmission from a source node.

Figure 2A:
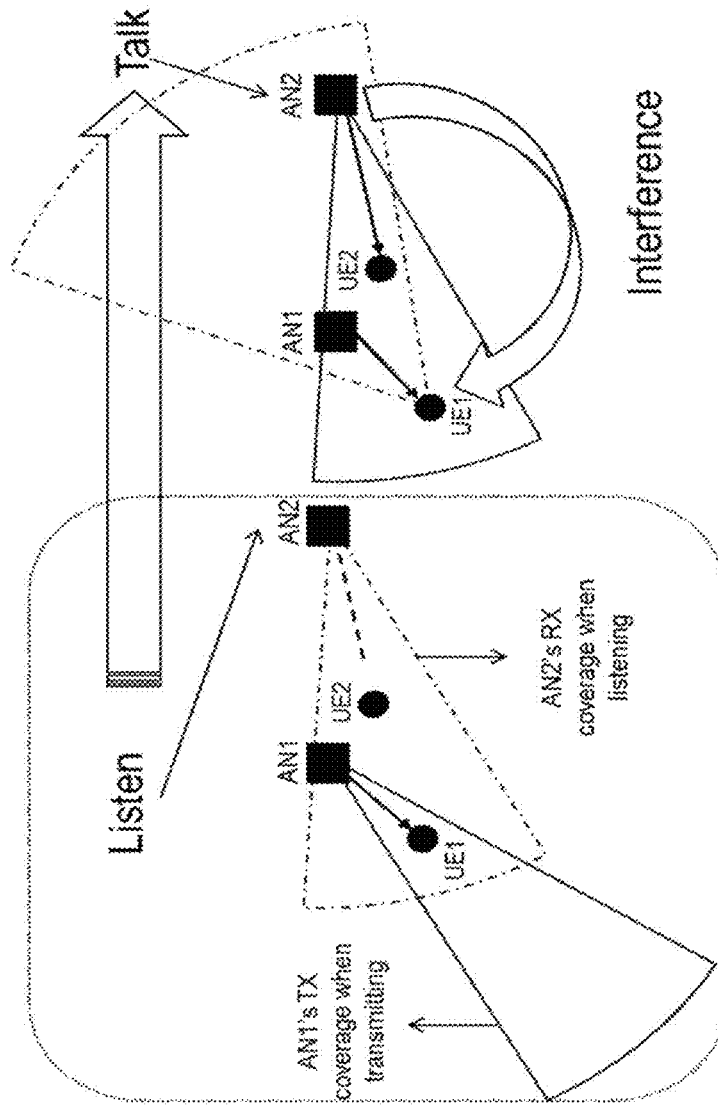
FIG. 2A illustrates a "hidden node" problem encountered in systems employing highly directional transmission when performing CSMA/CA like methods for medium access.

FIG. 2A shows an example of the hidden node problem, in which first and second access nodes AN1 and AN2 are configured to communicate with respective first and second user equipments UE1 and UE2 on the same frequency band. The left side of FIG. 2A shows second access node AN2 in a listening mode, and the right side of FIG. 2A shows second access node AN2 in a talking mode. During the listening mode, second access node AN2 fails to detect transmission by first access node AN1 because it is outside of AN1's transmission (TX) coverage, i.e., because AN1 is "hidden". Consequently, second access node AN2 mistakenly assumes that the frequency band is unoccupied, resulting in interference.

Figure 2B:
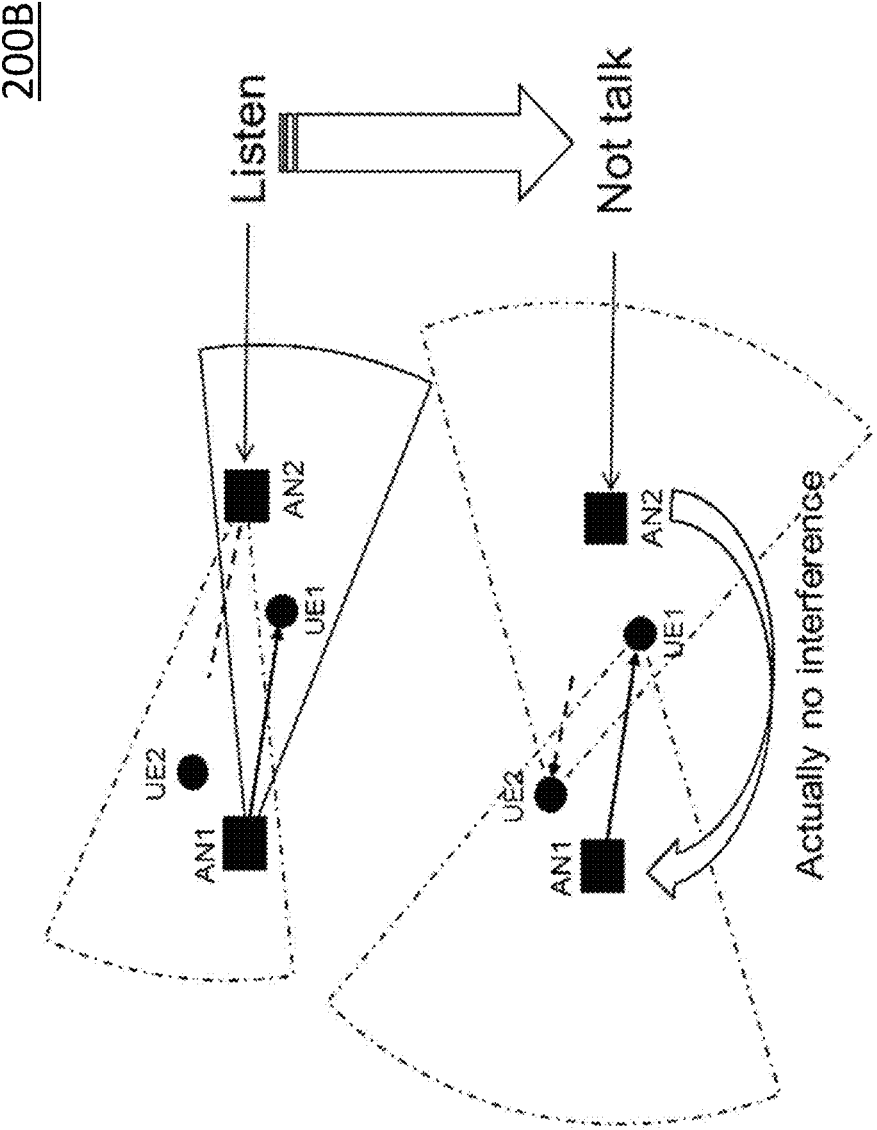
FIG. 2B illustrates an "exposed node" problem encountered in systems employing highly directional transmission when performing CSMA/CA like methods for medium access.

FIG. 2B shows an example of the exposed node problem, in which first and second access nodes AN1 and AN2 are configured to communicate with respective first and second user equipments UE1 and UE2 on the same frequency band. The upper portion of FIG. 2B shows second access node AN2 in a listening mode, and the lower portion of FIG. 2A shows second access node AN2 in a talking mode. During the listening mode, second access node AN2 detects transmission by first access node AN1, and mistakenly concludes that the frequency band is unavailable for communication between second access node AN2 to second user equipment UE2, resulting in unnecessary idle time.

The LAT mechanism addresses the abovementioned hidden and exposed node problems in directional communication scenarios. One reason for these problems with LBT is the large difference between sensed power at the source node side and interference power at the destination node side in high gain beamforming case. LBT relies on listening at the source node to determine if there will be interference at the destination node and thus large difference between them will result in severe problems. To address these problems, LAT considers involving the destination node to sense the channel directly.

Another reason for employing LAT in communication scenarios involving directional communications is a relatively low interference environment e.g., a relatively low number of collisions for directional transmissions. For this reason, LAT adopts a different logic compared to LBT, described as follows: a default mode for a source node is "to send", and LAT prevents the source node from sending information when it is confirmed that channel is occupied by interfering transmissions. The source node transmits when data packets are available for transmission, and it resolves collisions detected by the destination node using coordination signaling.

To help illustrate the LAT scheme, the following concepts are introduced.

Idle time may occur after continuous data transmission. This is reasonable for shared spectrum (e.g., unlicensed band) since there are typically channel occupation limitation rules, e.g., the source node must stop transmitting and enter idle state after the contiguous transmission time exceeds a predetermined threshold.

A notify-to-send (NTS) message can be transmitted by a source or destination node, and it may include e.g. link information for transmission of data and expected occupation time duration.

A notify-not-to-send (NNTS) message is transmitted from a destination node, telling a source node not to transmit data in an indicated duration.

Figure 3:
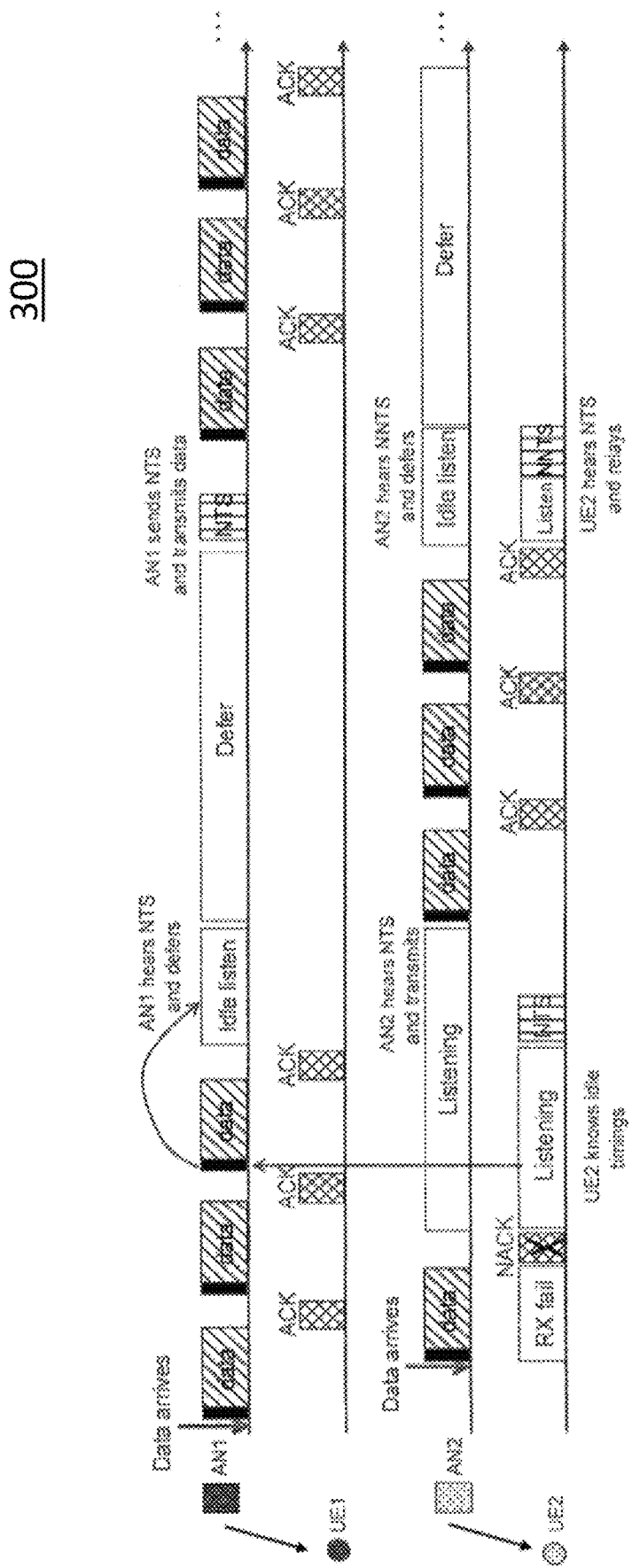
FIG. 3 illustrates a listen-after talk (LAT) procedure, according to an embodiment of the disclosed subject matter.

FIG. 3 illustrates an example of an LAT scheme. In this example, first and second access nodes AN1 and AN2 communicate with respective first and second user equipments UE1 and UE2. First access node AN1 acts as a source node with respect to first user equipment UE1, and first user equipment UE1 acts as a destination node with respect to first access node AN 1. Similarly, second access node AN2 acts as a source node with respect to second user equipment UE2, and second user equipment UE2 acts as a destination node with respect to second access node AN2.

Referring to FIG. 3, a listening function at each destination node is triggered when it detects interference and fails to receive data as expected. Then, the destination node of the interfered link coordinates data transmission with the source node of the interfering link(s). Finally, coordination is performed during idle time of interfering link. More concretely, communication between AN2 and UE2 is interfered by communication between AN1 and UE1. When UE2 fails to decode the data, it searches for the idle period of the interfering link and sends NTS message towards the AN2 direction. Because UE2 is interfered by AN1, AN1 can receive the message as well and then defer the transmission as indicated by an NTS message. The NTS message also indicates when AN2 will stop transmission and listen. i.e., idle period of communication between AN2 and UE2. Then AN1 transmits NTS that can be received by UE2. Finally, NNTS is relayed by UE2 to let its transmitter AN2 know which resource is occupied by the interfering link and refrain from transmitting. By this scheme, the transmission of this interference pair (i.e. AN1-UE1 and AN2-UE2) is coordinated in a distributed way in order to carry out transmissions efficiently by taking turns.

Figure 4A:
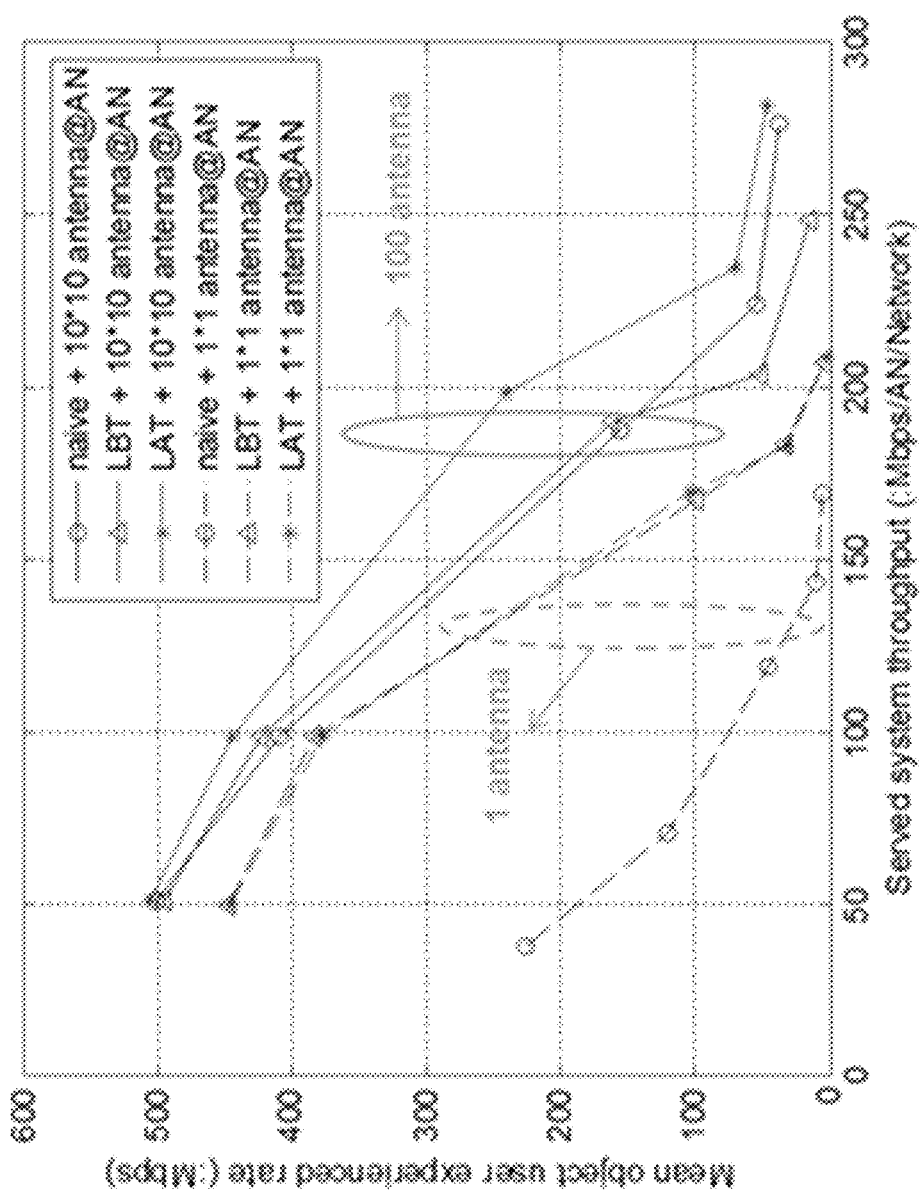
FIG. 4A illustrates mean object user experienced rate versus served system throughput for various alternative channel access procedures.
Figure 4B:
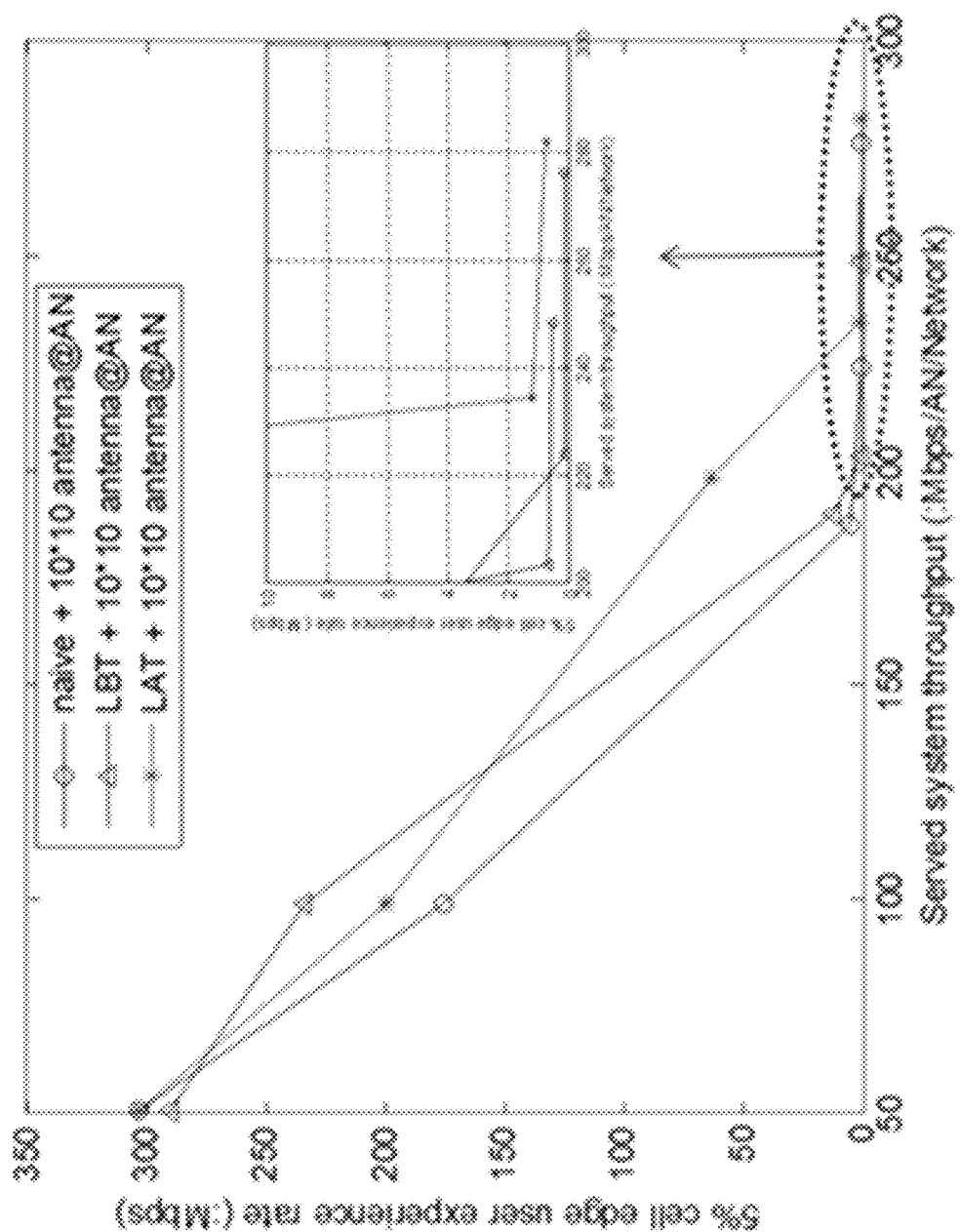
FIG. 4B illustrates 5% cell edge user experienced rate versus served system throughput for various alternative channel access procedures.

FIGS. 4A and 4B are graphs illustrating performance comparisons between different coexistence schemes, including LAT, LBT, and direct transmission without any coordination. These graphs represent the results of simulations that have been conducted to study both mean object user experience rate (FIG. 4A) and 5% cell edge user rate (FIG. 4B) under different traffic settings.

From dashed curves in FIG. 4A, it can be observed that LBT works better than naïve schemes (i.e., direct transmission without any coordination) and has similar performance with LAT in a 1 antenna case. This means LBT is preferred which is widely used in current systems. However, in a 100 antenna array case as shown in solid lines of FIGS. 4A and 4B, LBT has similar performance with naive scheme in low traffic case and worse performance than naïve scheme in high traffic case. On the other hand, LAT has much better performance than LBT in terms of mean and 5% cell edge experienced rate.

Self-contained communication is a technique that has been adopted in NR for some types of communication, such as Hybrid Automatic Repeat Request (HARQ) and scheduling transmissions. In general, a self-contained communication is one in which a source node transmits information and receives feedback for the transmitted information within a contiguous, uninterrupted interval. Such an interval may be, for instance, a single slot as defined in 3GPP NR specifications. Alternatively, the interval may include multiple consecutive slots.

Figure 5:
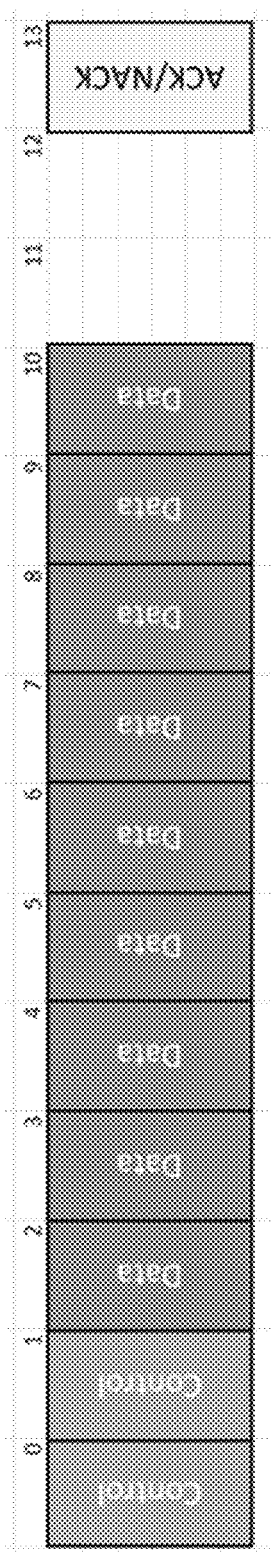
FIG. 5 illustrates an example of self-contained communication, according to an embodiment of the disclosed subject matter.

FIG. 5 illustrates an example of self-contained communication, according to an embodiment of the disclosed subject matter. In this example, a slot comprises 14 symbols divided into a control interval (symbols 0-1), a data interval (symbols 2-10), an idle interval (symbols 11-12) and a feedback interval (symbol 13). Symbols 11 and 12 are used for guard time for TX-RX switching, data processing, etc. A different amount of time could be used for the idle interval or guard time, although a duration of 2 symbols seems a practical and promising value. Notably, the use of 14 symbols in this example is not indicative of a limitation of the described concepts, but rather is used for illustration purposes. Alternatively, for instance, an LAT scheme can flexibly be applied when using a mini-slot concept of NR as well.

The term "control interval", in this context, refers to a contiguous time period or set of physical resources in which a source node transmits control information to a destination node. The control information typically indicates the timing of various transmissions (e.g., data, feedback, etc.) to occur in the self-contained communication and/or the amount of information to be communicated in those transmissions. In other words, the control information may indicate where the data and feedback interval are located. In this way, the duration of consecutive data transmission can be adapted, for instance, based on a contention level, traffic characteristics, etc. As an alternative to expressly indicating the location of each part of the self-contained communication, the control information may convey some of the information implicitly. For instance, the control information may indicate the location of the data and feedback intervals, and the location of the idle interval (or coordination interval—see FIG. 6) may be implicitly defined based on one or more of the other intervals. For instance, if the size of the idle interval is known, its specific location can be inferred from the location of the feedback interval.

The term "data interval", in this context, refers to a contiguous time period or set of physical resources in which data is transmitted. The term "idle interval", in this context, refers to a contiguous time period or set of physical resources in which the source node must refrain from transmission to facilitate spectrum sharing. The term "feedback interval", in this context, refers to a contiguous time period or set of physical resources in which the source node listens to receive feedback regarding transmissions made during the data interval.

One potential benefit of self-contained operation is that it can reduce downlink/uplink (DL/UL) latency. Another potential benefit is that it has inbuilt support for forward compatibility because DL/UL scheduling does not have any impact outside the slot. Yet another potential benefit is that it can allow a reduction in the number of HARQ processes.

Figure 6:
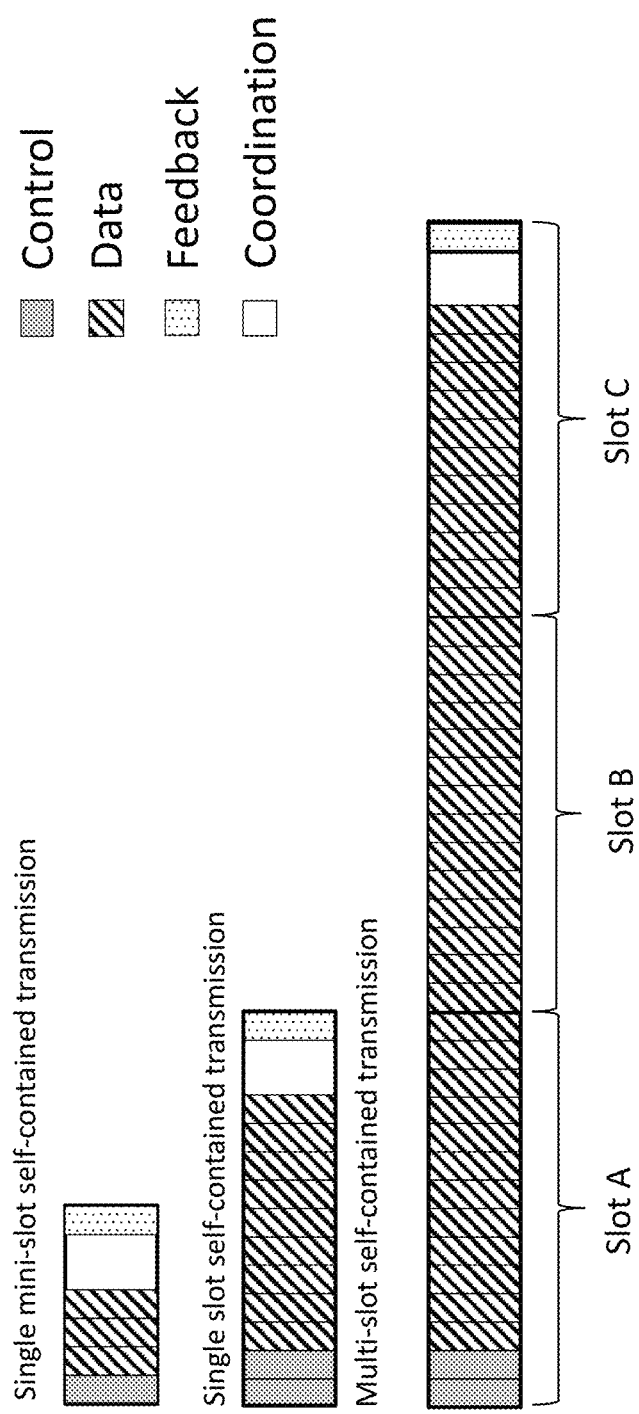
FIG. 6 illustrates other examples of self-contained communication, according to embodiments of the disclosed subject matter.

FIG. 6 illustrates other examples of self-contained communication, according to embodiments of the disclosed subject matter. In a first example, on the top of FIG. 6, data transmission is performed with a self-contained mini-slot format. In a second example, in the middle of FIG. 6, data transmission is performed within a self-contained slot format. In a third example, on the bottom of FIG. 6, data transmission is performed in a multi-slot self-contained transmission. Each of these examples may achieve relatively fast feedback compared to alternative approaches in which feedback is communicated in a different slot or subframe from data. Additionally, the slot lengths can vary in size from one transmission instance to another (e.g. NR adapts and uses variable slot lengths (including mini-slots)). The slot lengths could also be of variable lengths within a given transmission.

Referring to FIG. 6, each type of self-contained transmission comprises a control interval, followed by a data interval, then a coordination interval, then a feedback interval. In contrast to the example of FIG. 5, these examples use the interval between the data interval and the feedback interval for communication of coordination signaling for an LAT process, rather than as an idle interval. The interval, used in this manner, is referred to as a "coordination interval".

The coordination interval is typically used to communicate coordination signaling for an LAT scheme, such as NTS or NNTS. This may allow more effective use of an LAT scheme in an NR framework, and elimination of explicit idle periods, which may lead to an overall increased efficiency of the system.

To use the coordination interval, both a source node and a destination node carry out algorithmic adjustments as illustrated in FIGS. 7 and 8, for example. This approach can be used to eliminate explicit idle listening durations in an LAT scheme, and can make LAT transmission more efficient in NR self-contained communications.

Figure 7A:
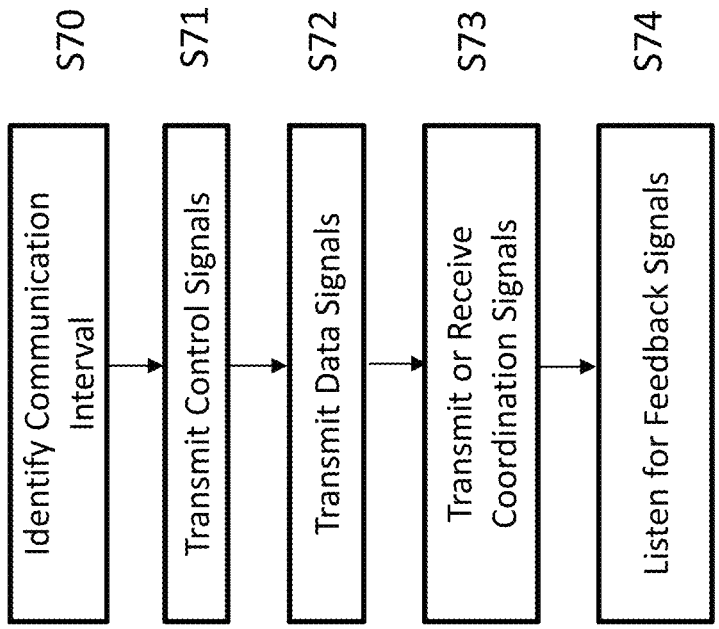
FIG. 7A illustrates a method of operating a source node for LAT based communication in an NR system, according to an embodiment of the disclosed subject matter.

FIG. 7A illustrates a method 700A of operating a source node according to an embodiment of the disclosed subject matter. This method could be performed by e.g. a wireless communication device or radio access node such as those described in relation to FIGS. 10-13.

Referring to FIG. 7A, the method comprises identifying a communication interval for communication between the source node and a destination node (S70), the communication interval comprising a control interval, a data interval disposed after the control interval, a coordination interval disposed after the data interval, and a feedback interval disposed after the coordination interval. The communication interval, configured in this manner, may be used for self-contained communication as discussed above.

The identification of the communication interval may be accomplished in any reasonable manner, such as the source node being pre-configured to operate according to the communication interval, or alternatively the source node determining the communication interval from stored or received information, as examples. The communication interval may be, for instance, a single slot as defined in NR or another radio access technology. Such a slot could comprise, for instance, fourteen consecutive orthogonal frequency division multiplexing (OFDM) symbols 0-13 as shown in FIG. 5, where the coordination interval comprises symbols 11-12, and the feedback interval comprises symbol 13. Alternatively, the communication interval could comprise multiple slots as shown in FIG. 6.

The method further comprises transmitting one or more control signals during the control interval (S71), transmitting one or more data signals during the data interval (S72), transmitting or receiving one or more coordination signals during the coordination interval, the one or more coordination signals coordinating at least one aspect of an LAT procedure (S73), and listening for one or more feedback signals during the feedback interval, the one or more feedback signals indicating a status of the transmission of the one or more data signals (S74).

The one or more control signals typically indicate at least one of a start location and a duration of the data interval. Similarly, they may also indicate the start location and duration of the feedback interval and/or the coordination interval, for instance.

The coordination signals may comprise, e.g., an NTS message and/or NNTS message, such as those discussed above. Such signals can be communicated in any of various alternative ways or forms. For instance, in some embodiments an NTS or NNTS message comprises a fractional symbol message that may occupy only part of a symbol in both the time and frequency domains. In some such embodiments, the fractional symbol message may reuse at least one of a sounding reference signal (SRS) and a demodulation reference signal (DM-RS). In still other embodiments, the NTS or NNTS may be communicated in a randomly selected resource unit within the coordination interval. The NTS or NNTS may also be received from the destination node together with an ACK or NACK message, which means that there is no recognized interval between NTS/NNTS and ACK/NACK.

Figure 7B:
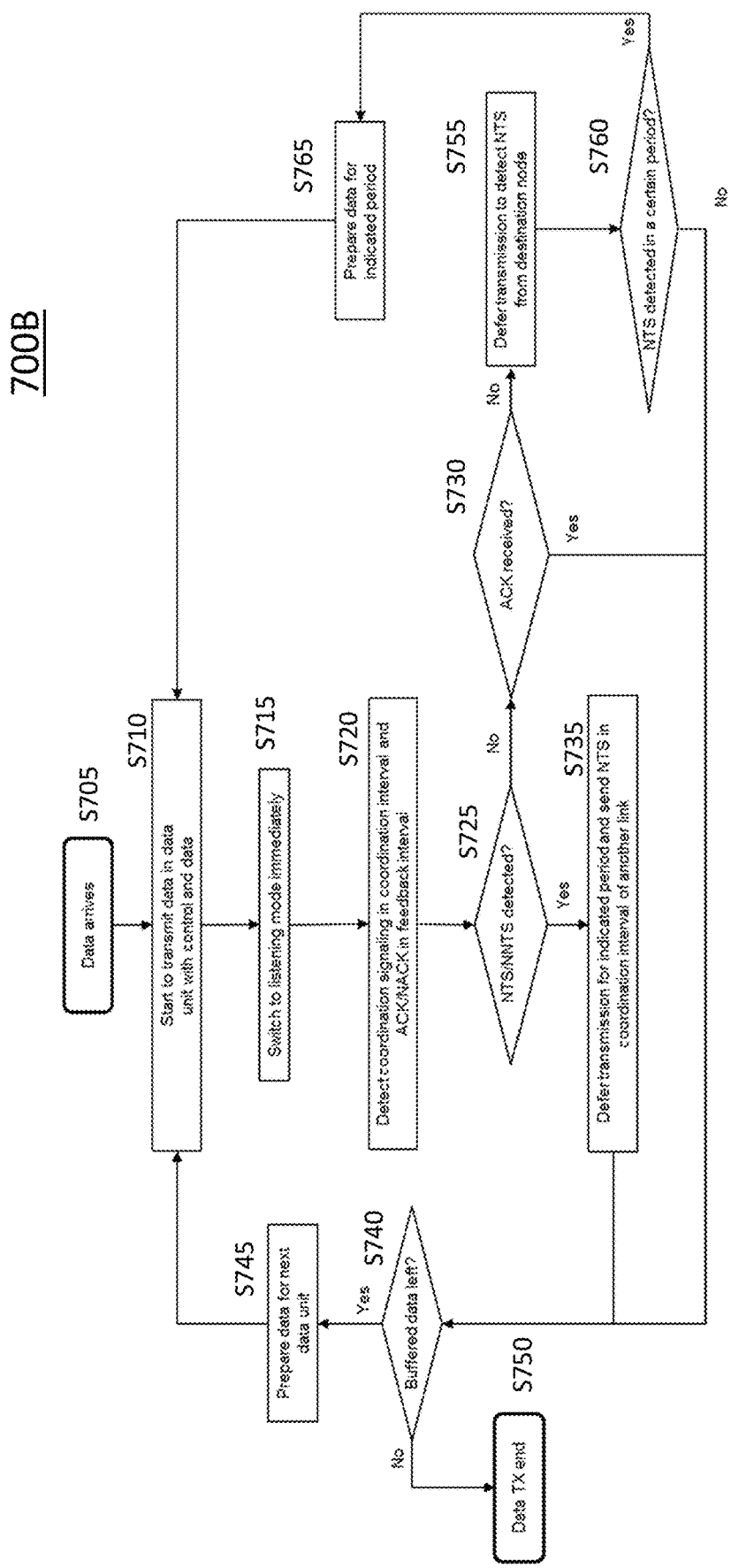
FIG. 7B illustrates a method of operating a source node for LAT based communication in an NR system, according to another embodiment of the disclosed subject matter.

FIG. 7B illustrates a method 700B of operating a source node according to another embodiment of the disclosed subject matter. In method 700B, the source node may perform the operations of method 700A, in addition to or in conjunction with those specifically illustrated in FIG. 7B. Method 700B could be performed by e.g. a wireless communication device or radio access node such as those described in relation to FIGS. 10-13.

Referring to FIG. 7B, when a data packet arrives (S705), the source node transmits data directly without listening (S710), and thereafter switches to a listening mode (S715).

For each data unit, there will be a control, data, coordination, and feedback intervals as described above.

In the listening mode, the source node attempts to detect coordination signaling in the coordination interval and ACK/NACK in the feedback interval (S720). When nothing is received in the coordination interval and ACK is received successfully (S725=No & S730=Yes), the transmitting device continues data transmission until there is no data in the buffer (S740, S745, S750). Note that there is no need to have mandatory idle periods anymore as in other LAT schemes. When data transmission finishes, the transmitting device switches to the listening mode immediately in the coordination interval to detect if there is an NTS or NNTS frame.

If NTS or NNTS is detected (S725=Yes), the source node determines whether the NTS/NNTS message(s) indicate if it should defer for a certain time period or duration, and if the message(s) indicate that it should defer, the source node defers its transmission for the indicated duration and sends an NTS message in a coordination interval of another link (S735). In other words, in the defer period, the transmitting device tries to detect the coordination interval of the other link based on information sent in the control interval of the other link; then it transmits the NTS in the coordination interval to tell others not to transmit and start its own transmission.

If no NTS/NNTS message is detected (S725=No), and no ACK is received (S730=No), the source node defers transmission to receive an NTS message from the destination node (S755). When the ACK for the data is not received, it may be due to interference from another transmission, so the source node (e.g. a base station) generally defers transmission to detect a command from the destination node (e.g. a UE) to start transmission, i.e. NTS.

Upon successful reception of an NTS message (S760=Yes), the source node prepares data to be transmitted at time instant indicated in the received NTS (S765) and proceeds to S710. In this context, preparing the data generally involves encoding and modulation, and may include other operations. Otherwise (S760=No), the source node proceeds to S740.

In certain embodiments, method 700B can be implemented as one possible variation of method 700A, in which wherein transmitting or receiving the one or more coordination signals during the coordination interval comprises receiving an NTS or NNTS message, and the method further comprises deferring transmission for a duration indicated in the NTS or NNTS message, determining a coordination interval of a destination node that transmitted the NTS or NNTS message, and transmitting an NTS message to the destination node within the coordination interval of the destination node. Alternatively or additionally, method 700B can be viewed as a variation of method 700A that further comprises, as a consequence of listening for the one or more feedback signals, determining that an ACK or NACK message has not been received in response to the transmission of the one or more data signals, detecting an NTS message from a destination node, and in response to detecting the NTS message, transmitting information to the destination node according to a timing indicated by the NTS message.

Figure 8A:
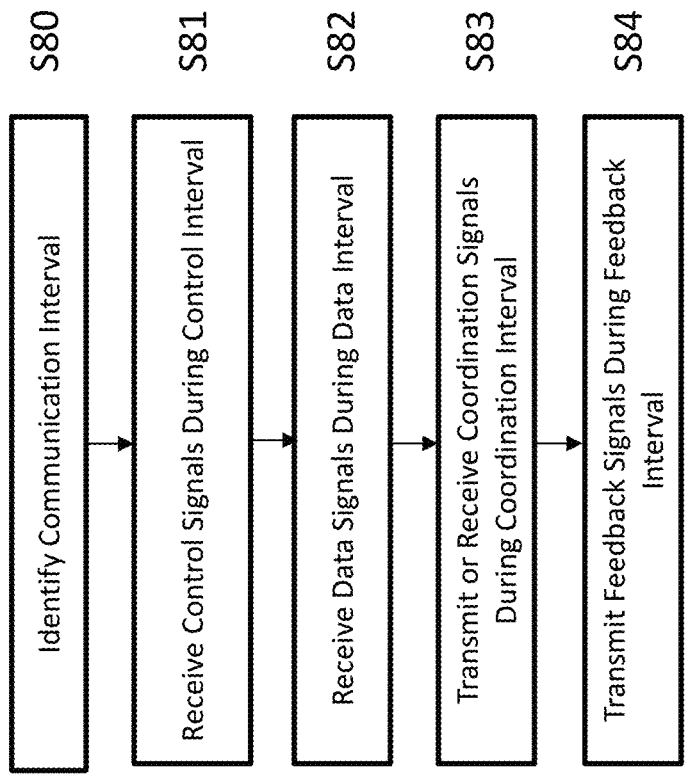
FIG. 8A illustrates a method of operating a destination node for LAT based communication in an NR system, according to an embodiment of the disclosed subject matter.

FIG. 8A illustrates a method 800A of operating a destination node, according to an embodiment of the disclosed subject matter. This method could be performed by e.g. a wireless communication device or radio access node such as those described in relation to FIGS. 10-13.

Referring to FIG. 8A, the method comprises identifying a communication interval for communication between a source node and the destination node (S80), the communication interval comprising a control interval, a data interval disposed after the control interval, a coordination interval disposed after the data interval, and a feedback interval disposed after the coordination interval. The communication interval, configured in this manner, may be used for self-contained communication as discussed above.

The identification of the communication interval may be accomplished in any reasonable manner, such as the destination node being pre-configured to operate according to the communication interval, or alternatively the destination node determining the communication interval from stored or received information, as examples. The communication interval may be, for instance, a single slot as defined in NR or another radio access technology. Such a slot could comprise, for instance, fourteen consecutive OFDM symbols 0-13 as shown in FIG. 5, where the coordination interval comprises symbols 11-12, and the feedback interval comprises symbol 13. Alternatively, the communication interval could comprise multiple slots as shown in FIG. 6.

The method further comprises receiving one or more control signals during the control interval (S81), receiving one or more data signals during the data interval (S82), transmitting or receiving one or more coordination signals during the coordination interval, the one or more coordination signals coordinating at least one aspect of a LAT procedure (S83), and transmitting one or more feedback signals during the feedback interval, the one or more feedback signals indicating a decoding status of the one or more data signals (S84).

The one or more control signals typically indicate at least one of a start location and a duration of the data interval. Similarly, they may also indicate the start location and duration of the feedback interval and/or the coordination interval, for instance.

The coordination signals may comprise, e.g., an NTS message and/or NNTS message, such as those discussed above. Such signals can be communicated in any of various alternative ways or forms. For instance, in some embodiments an NTS or NNTS message comprises a fractional symbol message that may occupy only part of a symbol in both the time and frequency domains. In some such embodiments, the fractional symbol message may reuse at least one of an SRS and a DM-RS. In still other embodiments, the NTS or NNTS may be communicated in a randomly selected resource unit within the coordination interval. The NTS or NNTS may also be received from the destination node together with an ACK or NACK message.

Figure 8B:
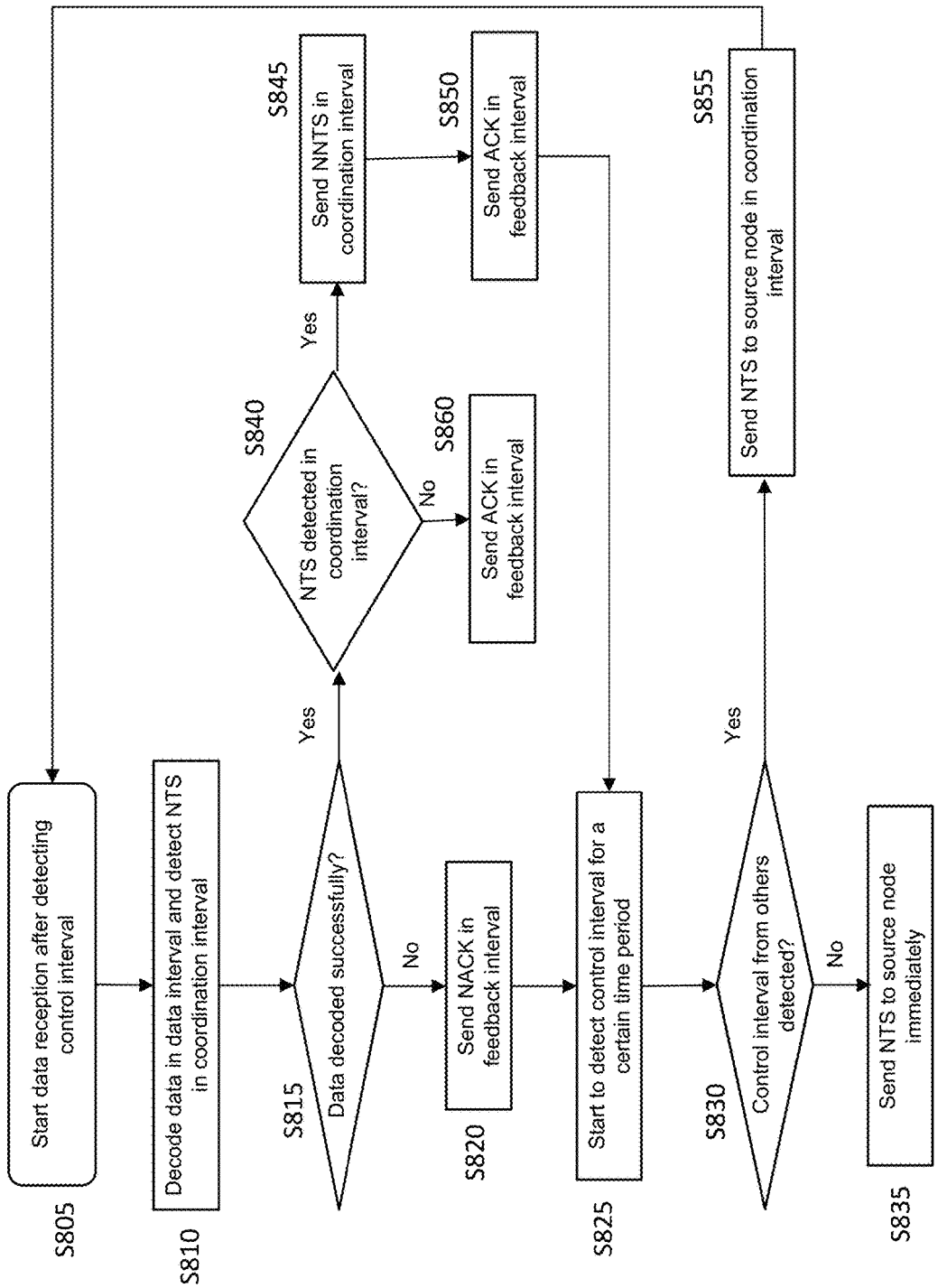
FIG. 8B illustrates a method of operating a destination node for LAT based communication in an NR system, according to an embodiment of the disclosed subject matter.
Figure 9:
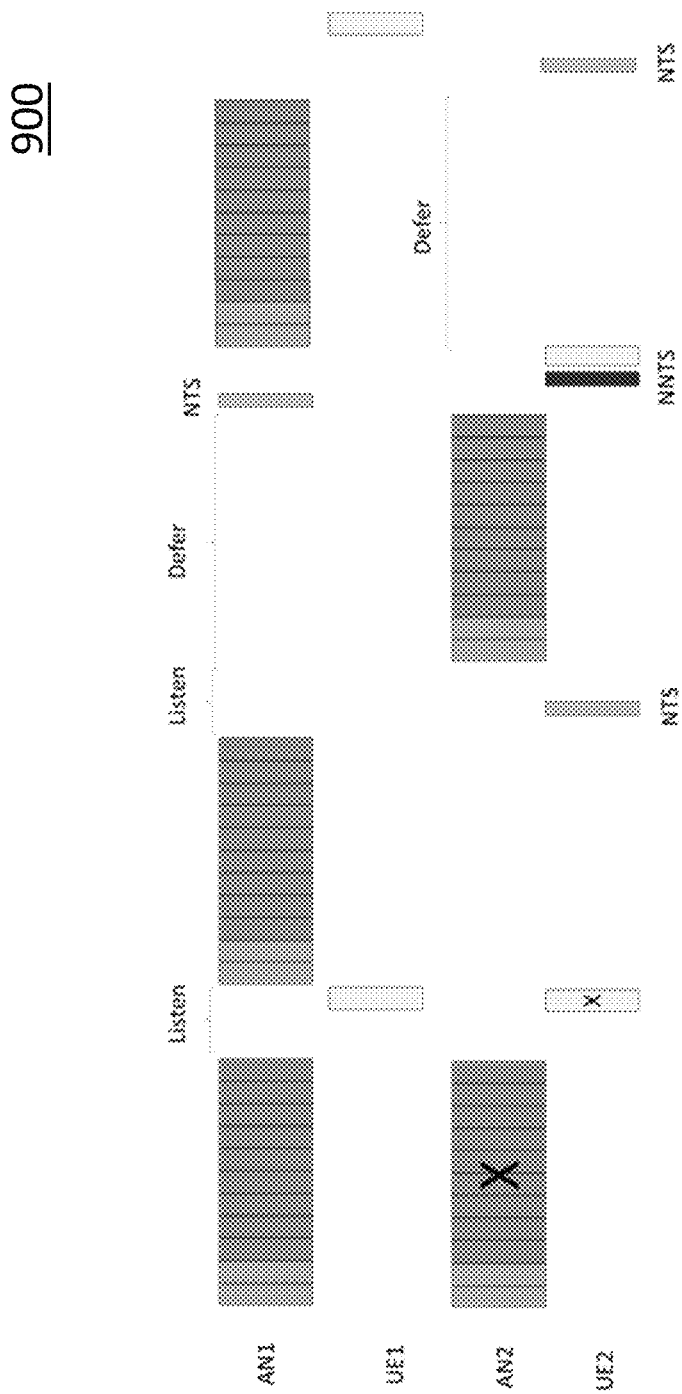
FIG. 9 illustrates an example of LAT using a coordination interval in an NR system, according to an embodiment of the disclosed subject matter.

FIG. 8B illustrates a method 800B of operating a destination node, according to an embodiment of the disclosed subject matter. In method 800B, the destination node may perform the operations of method 800A, in addition to or in conjunction with those specifically illustrated in FIG. 8B. Method 800B could be performed by e.g. a wireless communication device or radio access node such as those described in relation to FIGS. 10-13.

Referring to FIG. 8B, when starting data reception after detecting a control interval (S805), the destination node monitors the channel to decode data (S810). If the data is decoded successfully (S815=Yes), ACK is sent (S850, S860) after the coordination interval (S840, S845). Otherwise (S815=No), the destination node sends a NACK in the feedback interval (S820). Furthermore, if the destination node can identify that data transmission failure is due to interference from other links, some indicator can be included in NACK message.

When data is not decoded successfully (S815=No), the destination node starts listening to the channel to detect the control interval of other links' transmission for a certain time period, where the interval is generally configurable (S825). If the control interval from other link(s) is decoded when listening to the channel (S830=Yes), the destination node defers receiving until a coordination interval indicated in the control interval from the other link(s). Then in the coordination interval, it sends NTS to tell its source node to start transmission in the next slot for certain time period (e.g., 1 or 3 slots) (S855).

The maximum listening time is randomly determined. When the time has passed and nothing has been heard, the destination node will send NTS to the source node as well (S835).

In certain embodiments, method 800B can be implemented as one possible variation of method 800A in which the method further comprises, in response to a failure to decode the one or more data signals, transmitting a NACK during the feedback interval, and transmitting an NTS message to the source node during a coordination interval of a subsequent communication interval for communication between a source node and the destination node. Alternatively or additionally, method 800B can be viewed as a variation of method 800A that further comprises, in response to decoding the one or more data signals, detecting an NTS message from the sending node during the coordination interval, transmitting an NNTS message during the coordination interval, and transmitting an ACK message during the feedback interval.

As indicated above, in the examples of FIGS. 7 and 8 the NTS and/or NNTS messages may take various alternative forms, such as the following examples.

In one example, an NTS or NNTS message is a fractional symbol sequence/message that only occupies one part of the symbol in both time and frequency domain since it only includes very little information, e.g. less than 10 bits. Such an NTS or NNTS message could reuse existing signaling such as sounding reference signals (SRS), DM-RS which also include fractional design. For example, SRS/DM-RS in NR licensed design could only occupy part of one symbol. Then NTS/NNTS message could use the reserved sequence for SR/DM-RS to represent NTS/NNTS. Besides, the combination of multiple sequences could indicate multiple bits in the message.

In yet another example, when one node is willing to transmit an NTS or NNTS message in a coordination interval, it randomly selects a resource unit so that a potential collision will be resolved if multiple nodes want to transmit NTS/NNTS.

In yet another example, an NTS or NNTS message transmitted from a source node is incorporated into an ACK/NACK transmission.

In still another example, an NTS or NNTS message is transmitted in either a coordination interval or an idle interval, i.e. if there is a combination of coordination interval and idle interval.

The described embodiments may be implemented in any appropriate type of communication system supporting any suitable communication standards and using any suitable components. As one example, certain embodiments may be implemented in a communication system such as that illustrated in FIG. 10A or 10B.

Figure 10A:
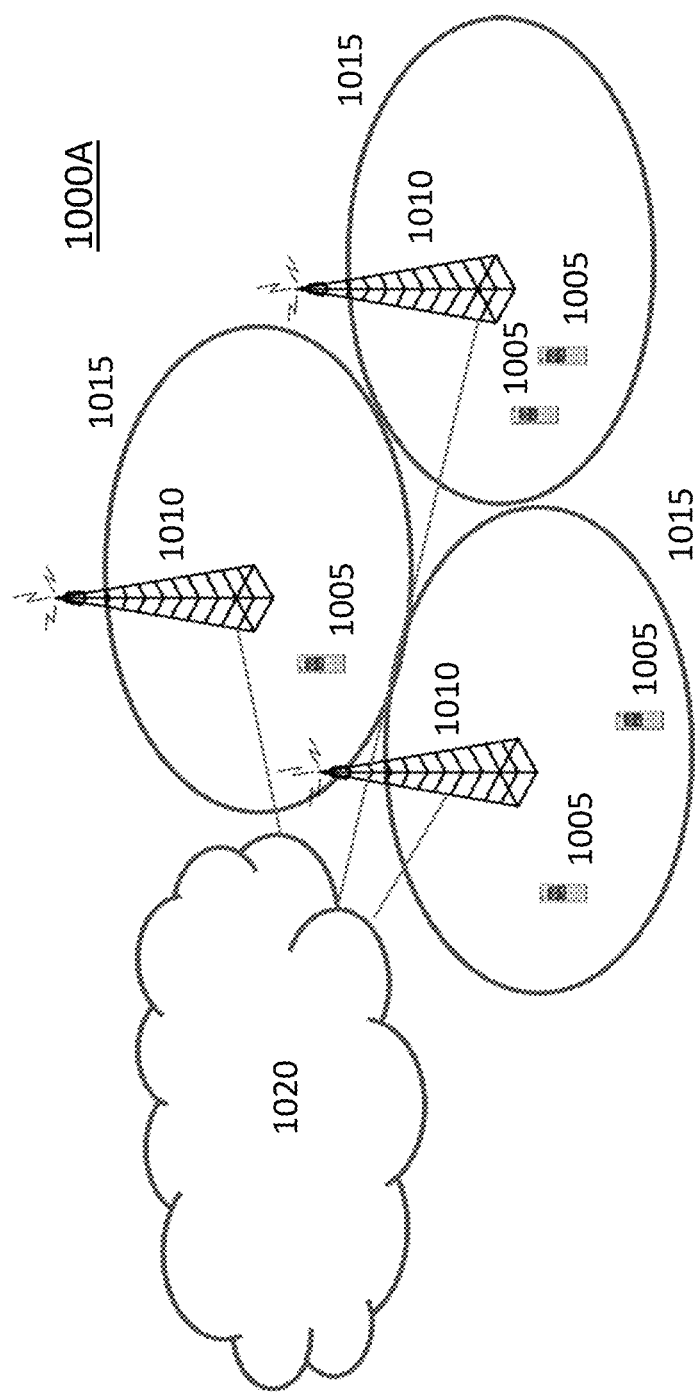
FIG. 10A illustrates a communication system according to an embodiment of the disclosed subject matter.

Referring to FIG. 10A, a communication system 1000A comprises a plurality of wireless communication devices 1005 (e.g., UEs, machine type communication [MTC]/machine-to-machine [M2M] UEs) and a plurality of radio access nodes 1010 (e.g., eNodeBs or other base stations). Communication system 1000A is organized into cells 1015, which are connected to a core network 1020 via corresponding radio access nodes 1010. Radio access nodes 1010 are capable of communicating with wireless communication devices 1005 along with any additional elements suitable to support communication between wireless communication devices or between a wireless communication device and another communication device (such as a landline telephone). Any of radio access nodes 1010 or wireless communication devices 1005 may act as source nodes or destination nodes for performing corresponding methods as described herein.

Figure 10B:
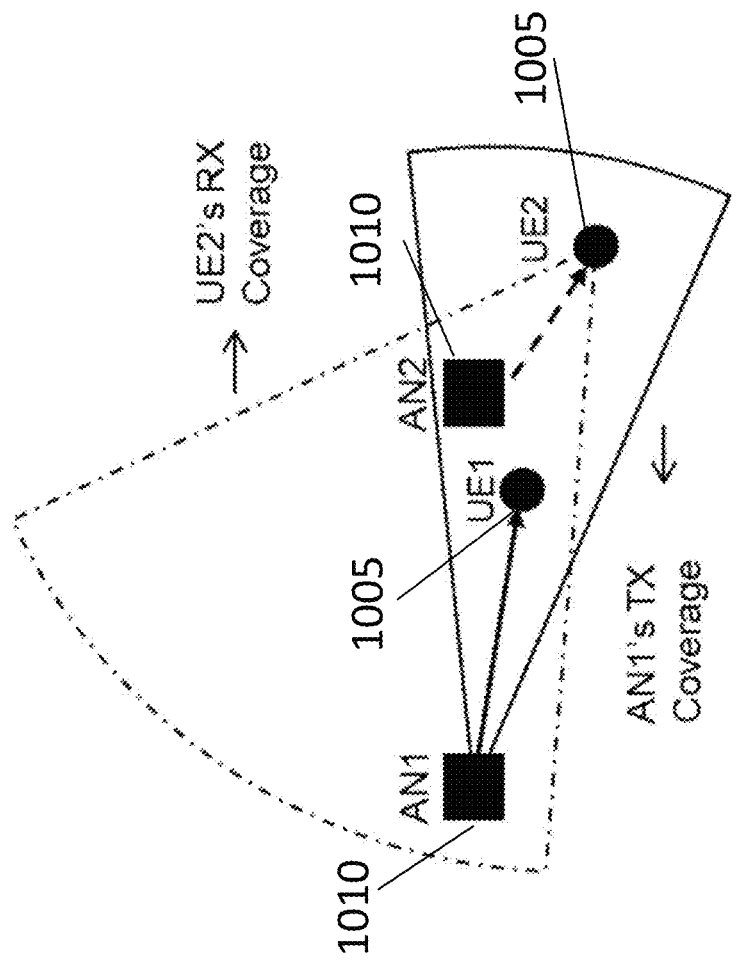
FIG. 10B illustrates a communication system according to another embodiment of the disclosed subject matter.

FIG. 10B illustrates an example 5G RAT network 1000B according to an embodiment of the disclosed subject matter. 5G RAT network 1000B is a wireless network operating in a millimeter-wave band, and it is presented as an example of a system in which the above described methods could be implemented in order to mitigate or avoid certain types of interference.

Referring to FIG. 10B, 5G RAT network 1000B comprises first and second access nodes AN1 and AN2 and first and second user equipments UE1 and UE2, which are examples of radio access nodes 1010 and wireless communication devices, respectively. Two communication links are formed by communication between first access node AN1 and first UE1 (AN1→UE1), and communication between second access node AN2 and second UE2 (AN1→UE1). AN1 transmits data to UE1 via the communication link AN1→UE1, and AN2 transmits data to UE2 via the communication link AN2→UE2. In other embodiments, the 5G RAT network 1000B may comprise three or more communication links.

Each of the communication apparatuses in FIG. 10B uses directional transmission realized with e.g. an antenna array, and thus has a TX coverage area and an RX coverage area. In 5G RAT network 1000B, if a first communication apparatus transmits data to a second communication apparatus via a communication link between them, then the first communication apparatus should be in the RX coverage of the second communication apparatus and the second communication apparatus should meanwhile be in the TX coverage of the first communication apparatus.

In the illustrated example in FIG. 10B, first access node AN1 has a sector TX coverage and UE1 has a sector RX coverage (not shown). If first access node AN1 is going to transmit data to UE1 via the first communication link, then AN1 must be in the RX coverage of UE1 and UE1 must be in the TX coverage of AN1. This equally applies to AN2 and UE2.

In this example, the communication links are assumed to operate in a same channel or carrier in 5G RAT network 1000B. In particular, AN1, AN2, UE1 and UE2 operate in a same channel or carrier, which means the first communication link between AN1 and UE1 shares the same channel or carrier with the second communication link between AN2 and UE2.

Due to sharing, interference may occur when communication links works at the same time. In the illustrated example in FIG. 10B, because AN1 is in the RX coverage of UE2 and UE2 is in the TX coverage of AN1, UE2 will be interfered by AN1 transmitting data to UE1 when AN2 is transmitting data to UE2 at the same time. Although FIG. 10B only illustrates the second communication link being interfered by the first communication link, it can be contemplated that other interference cases may occur, for example, the first communication link is interfered by the second communication link, the second communication link and the first communication link interfere with each other due to overlapping of RX range and TX range of different links.

In illustrated examples, the communication apparatuses for transmitting data are shown as access nodes AN1 and AN2. In other examples, the communication apparatuses for transmitting data may be User Equipments or other communication apparatuses which can transmit data with directional transmission. Similarly, although the communication apparatuses for receiving data are shown as User Equipments UE1 and UE2 in FIG. 10B, the communication apparatuses for receiving data may be Access Nodes or other communication apparatuses which can receive data with directional transmission.

Figure 11B:
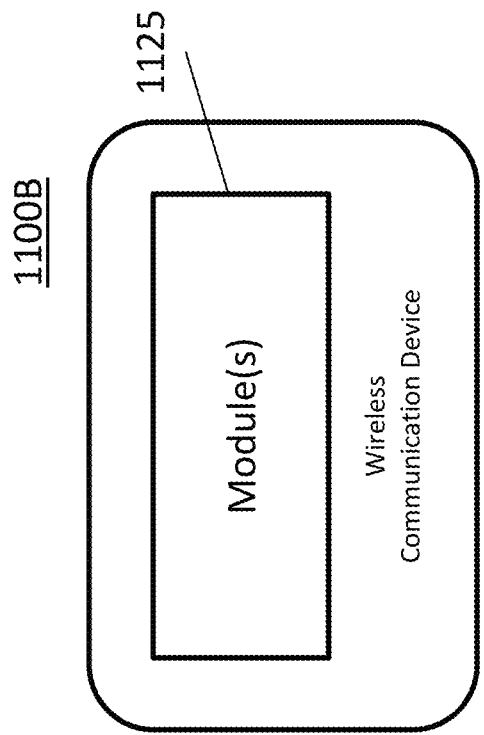
FIG. 11B illustrates a wireless communication device according to another embodiment of the disclosed subject matter.
Figure 11A:
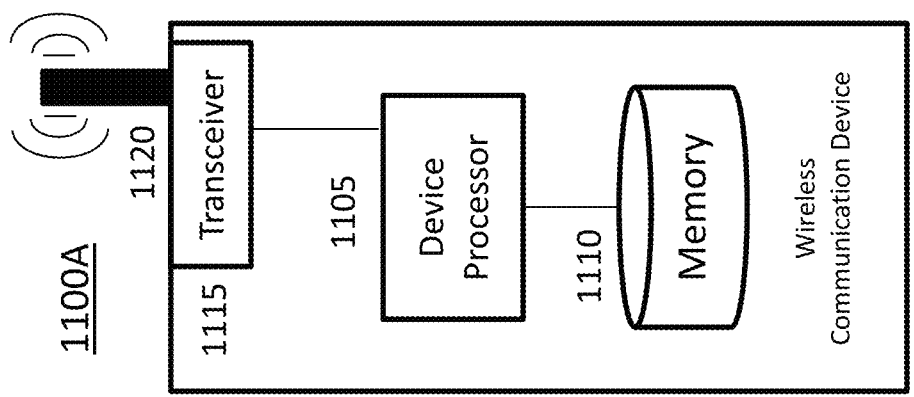
FIG. 11A illustrates a wireless communication device according to an embodiment of the disclosed subject matter.

Although wireless communication devices 1005 may represent communication devices that include any suitable combination of hardware and/or software, these wireless communication devices may, in certain embodiments, represent devices such as those illustrated in greater detail by FIGS. 11A and 11B. Similarly, although the illustrated radio access node may represent network nodes that include any suitable combination of hardware and/or software, these nodes may, in particular embodiments, represent devices such those illustrated in greater detail by FIGS. 12A, 12B and 13.

Referring to FIG. 11A, a wireless communication device 1100A comprises a processor 1105 (e.g., Central Processing Units [CPUs], Application Specific Integrated Circuits [ASICs], Field Programmable Gate Arrays [FPGAs], and/or the like), a memory 1110, a transceiver 1115, and an antenna 1120. In certain embodiments, some or all of the functionality described as being provided by UEs, MTC or M2M devices, and/or any other types of wireless communication devices may be provided by the device processor executing instructions stored on a computer-readable medium, such as memory 1110. Alternative embodiments may include additional components beyond those shown in FIG. 11A that may be responsible for providing certain aspects of the device's functionality, including any of the functionality described herein.

Referring to FIG. 11B, a wireless communication device 1100B comprises at least one module 1125 configured to perform one or more corresponding functions. Examples of such functions include various method steps or combinations of method steps as described herein with reference to wireless communication device(s). In general, a module may comprise any suitable combination of software and/or hardware configured to perform the corresponding function. For instance, in some embodiments a module comprises software configured to perform a corresponding function when executed on an associated platform, such as that illustrated in FIG. 11A.

Figure 12A:
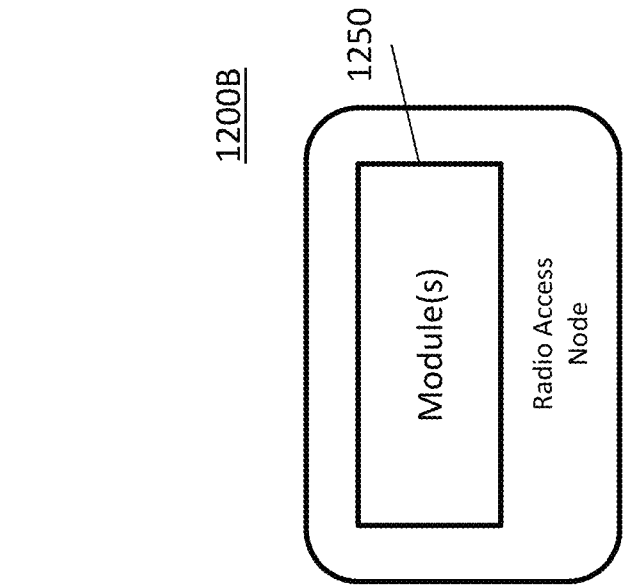
FIG. 12A illustrates a radio access node according to an embodiment of the disclosed subject matter.

Referring to FIG. 12A, a radio access node 1200A comprises a control system 1220 that comprises a node processor 1205 (e.g., Central Processing Units (CPUs), Application Specific Integrated Circuits (ASICs), Field Programmable Gate Arrays (FPGAs), and/or the like), memory 1210, and a network interface 1215. In addition, radio access node 1200A comprises at least one radio unit 1225 comprising at least one transmitter 1235 and at least one receiver coupled to at least one antenna 1230. In some embodiments, radio unit 1225 is external to control system 1220 and connected to control system 1220 via, e.g., a wired connection (e.g., an optical cable). However, in some other embodiments, radio unit 1225 and potentially the antenna 1230 are integrated together with control system 1220. Node processor 1205 operates to provide at least one function 1245 of radio access node 1200A as described herein. In some embodiments, the function(s) are implemented in software that is stored, e.g., in the memory 1210 and executed by node processor 1205.

In certain embodiments, some or all of the functionality described as being provided by a base station, a node B, an enodeB, and/or any other type of network node may be provided by node processor 1205 executing instructions stored on a computer-readable medium, such as memory 1210 shown in FIG. 12A. Alternative embodiments of radio access node 1200 may comprise additional components to provide additional functionality, such as the functionality described herein and/or related supporting functionality.

Figure 12B:
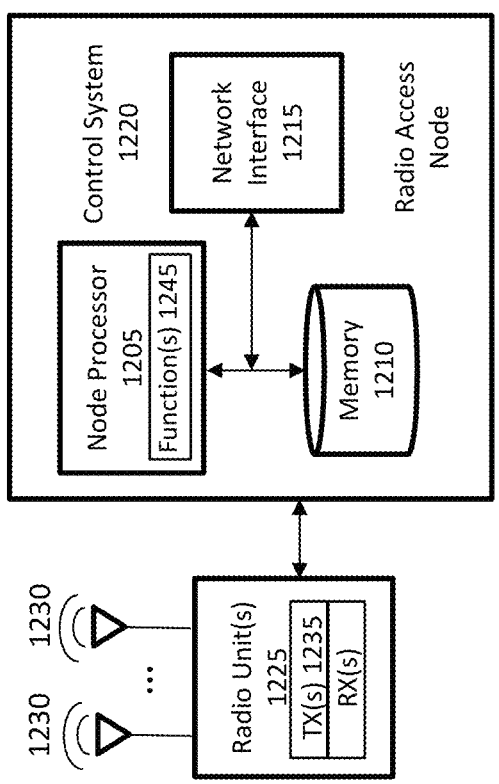
FIG. 12B illustrates a radio access node according to another embodiment of the disclosed subject matter.

Referring to FIG. 12B, a radio access node 1200B comprises at least one module 1250 configured to perform one or more corresponding functions. Examples of such functions include various method steps or combinations of method steps as described herein with reference to radio access node(s). In general, a module may comprise any suitable combination of software and/or hardware configured to perform the corresponding function. For instance, in some embodiments a module comprises software configured to perform a corresponding function when executed on an associated platform, such as that illustrated in FIG. 12A.

Figure 13:
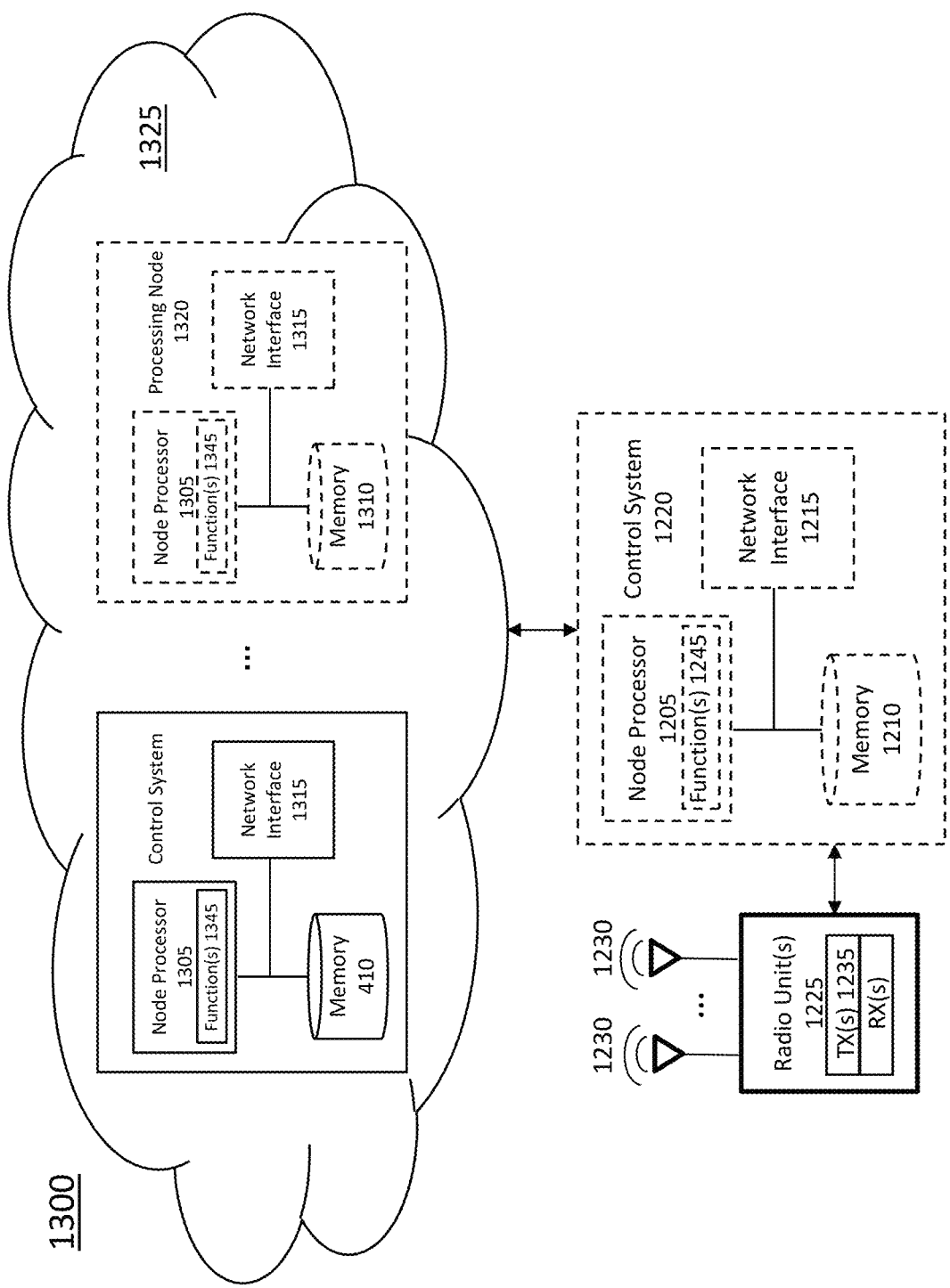
FIG. 13 illustrates a radio access node according to yet another embodiment of the disclosed subject matter.

FIG. 13 is a block diagram that illustrates a virtualized radio access node 1300 according to an embodiment of the disclosed subject matter. The concepts described in relation to FIG. 13 may be similarly applied to other types of network nodes. Further, other types of network nodes may have similar virtualized architectures. As used herein, the term "virtualized radio access node" refers to an implementation of a radio access node in which at least a portion of the functionality of the radio access node is implemented as a virtual component(s) (e.g., via a virtual machine(s) executing on a physical processing node(s) in a network(s)).

Referring to FIG. 13, radio access node 1300 comprises control system 1220 as described in relation to FIG. 12A.

Control system 1220 is connected to one or more processing nodes 1320 coupled to or included as part of a network(s) 1325 via network interface 1215. Each processing node 1320 comprises one or more processors 1305 (e.g., CPUs, ASICs, FPGAs, and/or the like), memory 410, and a network interface 1315.

In this example, functions 1245 of radio access node 1200A described herein are implemented at the one or more processing nodes 1320 or distributed across control system 1220 and the one or more processing nodes 1320 in any desired manner. In some embodiments, some or all of the functions 1245 of radio access node 1200A described herein are implemented as virtual components executed by one or more virtual machines implemented in a virtual environment(s) hosted by processing node(s) 1320. As will be appreciated by one of ordinary skill in the art, additional signaling or communication between processing node(s) 1320 and control system 1220 is used in order to carry out at least some of the desired functions 345. As indicated by dotted lines, in some embodiments control system 1220 may be omitted, in which case the radio unit(s) 1225 communicate directly with the processing node(s) 1320 via an appropriate network interface(s).

In some embodiments, a computer program comprises instructions which, when executed by at least one processor, causes at least one processor to carry out the functionality of a radio access node (e.g., radio access node 1010 or 1200A) or another node (e.g., processing node 1320) implementing one or more of the functions of the radio access node in a virtual environment according to any of the embodiments described herein.

The following is a list of acronyms that may be used in this written description.
ACK Acknowledgement
AN Access Network
AP Access Point
ARQ Automated Repeat request
BO Backoff
BS Base station
CCA Clear Channel Assessment
CFP Contention Free Period
CW Contention Window
DCF Distributed Coordination Function
DIF Data Indication Frame
DIFS DCF Inter-frame Spacing
DL Downlink
DRS Discovery Reference Signal
eNB evolved NodeB, base station
LAT Listen-after-talk
LBT Listen-before-talk
MCS Modulation Coding Scheme
NR New Radio (refers to the 5G radio interface)
NNTS Notify not to send
NTS Notify to send
RB Resource Block
RF Radio Frequency
RX Receiver
SCell Secondary Cell
SIFS Short Inter-frame Spacing
STA Station
TX Transmitter
UE User Equipment
UL Uplink While the disclosed subject matter has been presented above with reference to various embodiments, it will be understood that various changes in form and details may be made to the described embodiments without departing from the overall scope of the disclosed subject matter.

The invention claimed is:

1. A method of operating a source node in a wireless communications network, comprising:
   identifying a communication interval for communication between the source node and a destination node, the communication interval comprising a control interval, a data interval disposed after the control interval, a coordination interval disposed after the data interval, and a feedback interval disposed after the coordination interval;
   transmitting one or more control signals during the control interval;
   transmitting one or more data signals during the data interval;
   transmitting or receiving one or more coordination signals during the coordination interval, the one or more coordination signals coordinating at least one aspect of a listen-after-talk (LAT) procedure; and
   listening for one or more feedback signals during the feedback interval, the one or more feedback signals indicating a status of the transmission of the one or more data signals.

2. The method of claim 1, wherein the communication interval comprises a single slot.

3. The method of claim 1, wherein the communication interval comprises multiple slots.

4. The method of claim 3, wherein the one or more control signals indicate at least one of a start location and a duration of the data interval.

5. The method of claim 1, wherein transmitting or receiving the one or more coordination signals during the coordination interval comprises at least one of transmitting or receiving a notify-to-send (NTS) message, and receiving a notify-not-to-send (NNTS) message.

6. The method of claim 5, wherein the NTS or NNTS message comprises a fractional symbol message that occupies only part of a symbol in both time and frequency domains.

7. The method of claim 6, wherein the fractional symbol message reuses at least one of a sounding reference signal (SRS) and a demodulation reference signal (DM-RS).

8. The method of claim 5, wherein the NTS or NNTS is communicated in a randomly selected resource unit within the coordination interval.

9. The method of claim 5, wherein the NTS or NNTS is received from the destination node together with an acknowledgement (ACK) or negative acknowledgement (NACK) message.

10. The method of claim 1, wherein transmitting or receiving the one or more coordination signals during the coordination interval comprises receiving a notify-to-send (NTS) message or a notify-not-to-send (NNTS) message, and the method further comprises:
    deferring transmission for a duration indicated in the NTS or NNTS message;
    determining a coordination interval of a destination node that transmitted the NTS or NNTS message; and
    transmitting an NTS message to the destination node that transmitted the NTS or NNTS message, within the coordination interval of the destination node that transmitted the NTS or NNTS message.

11. The method of claim 1, further comprising, as a consequence of listening for the one or more feedback signals:
    determining that an acknowledgement (ACK) or negative acknowledgment (NACK) message has not been received in response to the transmission of the one or more data signals;
    detecting a notify-to-send (NTS) message from a second destination node; and
    in response to detecting the NTS message, transmitting information to the second destination node according to a timing indicated by the NTS message.

12. A source node, comprising:
    processing circuitry, memory, and transceiver circuitry collectively configured to:
    identify a communication interval for communication between the source node and a destination node, the communication interval comprising a control interval, a data interval disposed after the control interval, a coordination interval disposed after the data interval, and a feedback interval disposed after the coordination interval;
    transmit one or more control signals during the control interval;
    transmit one or more data signals during the data interval;
    transmit or receive one or more coordination signals during the coordination interval, the one or more coordination signals coordinating at least one aspect of a listen-after-talk (LAT) procedure; and listen for one or more feedback signals during the feedback interval, the one or more feedback signals indicating a status of the transmission of the one or more data signals.

13. The source node of claim 12, wherein the communication interval comprises a single slot.

14. The source node of claim 12, wherein the communication interval comprises multiple slots.

15. The source node of claim 14, wherein the one or more control signals indicate at least one of a start location and a duration of the data interval.

16. The source node of claim 12, wherein the transmission or reception of the one or more coordination signals during the coordination interval comprises at least one of transmitting or receiving a notify-to-send (NTS) message, and receiving a notify-not-to-send (NNTS) message.

17. The source node of claim 16, wherein the NTS or NNTS message comprises a fractional symbol message that occupies only part of a symbol in both time and frequency domains.

18. The source node of claim 17, wherein the fractional symbol message reuses at least one of a sounding reference signal (SRS) and a demodulation reference signal (DM-RS).

19. The source node of claim 16, wherein the NTS or NNTS is communicated in a randomly selected resource unit within the coordination interval.

20. The source node of claim 16, wherein the NTS or NNTS is received from the destination node together with an acknowledgement (ACK) or negative acknowledgement (NACK) message.

21. The source node of claim 12, wherein transmitting or receiving the one or more coordination signals during the coordination interval comprises receiving a notify-to-send (NTS) message or a notify-not-to-send (NNTS) message, and the processing circuitry, memory and transceiver circuitry are collectively further configured to:
defer transmission for a duration indicated in the NTS or NNTS message;
determine a coordination interval of a destination node that transmitted the NTS or NNTS message; and
transmit an NTS message to the destination node that transmitted the NTS or NNTS message, within the coordination interval of the destination node that transmitted the NTS or NNTS message.

22. The source node of claim 12, wherein the processing circuitry, memory and transceiver circuitry are further collectively configured to, as a consequence of listening for the one or more feedback signals:
determine that an acknowledgement (ACK) or negative acknowledgment (NACK) message has not been received in response to the transmission of the one or more data signals;
detect a notify-to-send (NTS) message from a second destination node; and
in response to detecting the NTS message, transmit information to the second destination node according to a timing indicated by the NTS message.

23. A method of operating a destination node in a wireless communications network, comprising:
identifying a communication interval for communication between a source node and the destination node, the communication interval comprising a control interval, a data interval disposed after the control interval, a coordination interval disposed after the data interval, and a feedback interval disposed after the coordination interval;

receiving one or more control signals during the control interval;
receiving one or more data signals during the data interval;
transmitting or receiving one or more coordination signals during the coordination interval, the one or more coordination signals coordinating at least one aspect of a listen-after-talk (LAT) procedure; and
transmitting one or more feedback signals during the feedback interval, the one or more feedback signals indicating a decoding status of the one or more data signals.

24. The method of claim 23, wherein the communication interval comprises a single slot.

25. The method of claim 23, wherein the communication interval comprises multiple slots.

26. The method of claim 25, wherein the one or more control signals indicate at least one of a start location and a duration of the data interval.

27. The method of claim 23, wherein transmitting or receiving the one or more coordination signals during the coordination interval comprises at least one of transmitting or receiving a notify-to-send (NTS) message, and transmitting a notify-not-to-send (NNTS) message.

28. The method of claim 27, wherein the NTS or NNTS message comprises a fractional symbol message that occupies only part of a symbol in both time and frequency domains.

29. The method of claim 28, wherein the fractional symbol message reuses at least one of a sounding reference signal (SRS) and a demodulation reference signal (DM-RS).

30. The method of claim 27, wherein the NTS or NNTS is communicated in a randomly selected resource unit within the coordination interval.

31. The method of claim 27, wherein the NTS or NNTS is received from the destination node together with an acknowledgement (ACK) or negative acknowledgement (NACK) message.

32. The method of claim 23, further comprising, in response to a failure to decode the one or more data signals:
transmitting a negative acknowledgement (NACK) during the feedback interval; and
transmitting a notify-to-send (NTS) message to the source node during a coordination interval of a subsequent communication interval for communication between the source node and the destination node.

33. The method of claim 23, further comprising, in response to decoding the one or more data signals:
detecting a notify-to-send (NTS) message from the source node during the coordination interval;
transmitting a notify-not-to-send (NNTS) message during the coordination interval; and
transmitting an acknowledgement (ACK) message during the feedback interval.

34. A destination node, comprising:
processing circuitry, memory, and transceiver circuitry collectively configured to:
identify a communication interval for communication between a source node and the destination node, the communication interval comprising a control interval, a data interval disposed after the control interval, a coordination interval disposed after the data interval, and a feedback interval disposed after the coordination interval;
receive one or more control signals during the control interval;
receive one or more data signals during the data interval;

transmit or receive one or more coordination signals during the coordination interval, the one or more coordination signals coordinating at least one aspect of a listen-after-talk (LAT) procedure; and transmit one or more feedback signals during the feedback interval, the one or more feedback signals indicating a decoding status of the one or more data signals.

35. The destination node of claim 34, wherein the communication interval comprises a single slot.

36. The destination node of claim 34, wherein the communication interval comprises multiple slots.

37. The destination node of claim 36, wherein the one or more control signals indicate at least one of a start location and a duration of the data interval.

38. The destination node of claim 34, wherein the transmission or reception of the one or more coordination signals during the coordination interval comprises at least one of transmitting or receiving a notify-to-send (NTS) message, and transmitting a notify-not-to-send (NNTS) message.

39. The destination node of claim 38, wherein the NTS or NNTS message comprises a fractional symbol message that occupies only part of a symbol in both time and frequency domains.

40. The destination node of claim 39, wherein the fractional symbol message reuses at least one of a sounding reference signal (SRS) and a demodulation reference signal (DM-RS).

41. The destination node of claim 38, wherein the NTS or NNTS is communicated in a randomly selected resource unit within the coordination interval.

42. The destination node of claim 38, wherein the NTS or NNTS is received from the destination node together with an acknowledgement (ACK) or negative acknowledgement (NACK) message.

43. The destination node of claim 34, further comprising, in response to a failure to decode the one or more data signals:

transmitting a negative acknowledgement (NACK) during the feedback interval; and transmitting a notify-to-send (NTS) message to the source node during a coordination interval of a subsequent communication interval for communication between the source node and the destination node.

44. The destination node of claim 34, wherein the processing circuitry, memory and transceiver circuitry are further collectively configured to, in response to decoding the one or more data signals:

detect a notify-to-send (NTS) message from the sending node during the coordination interval;

transmit a notify-not-to-send (NNTS) message during the coordination interval; and transmit an acknowledgement (ACK) message during the feedback interval.

\* \* \* \* \*